United States Patent
Wilfert

(10) Patent No.: US 12,200,046 B2
(45) Date of Patent: Jan. 14, 2025

(54) LOAD BALANCING DEVICE CONNECTIONS

(71) Applicant: SimpliSafe, Inc., Boston, MA (US)

(72) Inventor: Nathan Wilfert, Wellesley, MA (US)

(73) Assignee: SimpliSafe, Inc., Boston, MA (US)

( * ) Notice: Subject to any disclaimer, the term of this patent is extended or adjusted under 35 U.S.C. 154(b) by 6 days.

(21) Appl. No.: 18/355,201

(22) Filed: Jul. 19, 2023

(65) Prior Publication Data

US 2024/0163329 A1  May 16, 2024

Related U.S. Application Data

(60) Division of application No. 18/180,575, filed on Mar. 8, 2023, now Pat. No. 11,750,693, which is a continuation of application No. 18/055,652, filed on Nov. 15, 2022, now Pat. No. 11,888,929.

(51) Int. Cl.

| | |
|---|---|
| H04L 67/1012 | (2022.01) |
| H04L 67/02 | (2022.01) |
| H04L 67/1008 | (2022.01) |
| H04L 67/101 | (2022.01) |
| H04L 67/1014 | (2022.01) |
| H04L 67/1031 | (2022.01) |
| H04L 67/14 | (2022.01) |

(52) U.S. Cl.
CPC ......... *H04L 67/1014* (2013.01); *H04L 67/02* (2013.01); *H04L 67/1008* (2013.01); *H04L 67/101* (2013.01); *H04L 67/1012* (2013.01); *H04L 67/1031* (2013.01); *H04L 67/14* (2013.01)

(58) Field of Classification Search
None
See application file for complete search history.

(56) References Cited

U.S. PATENT DOCUMENTS

| | | | |
|---|---|---|---|
| 6,910,071 B2 * | 6/2005 | Quintero | G06F 16/958 709/224 |
| 7,039,708 B1 | 5/2006 | Knobl et al. | |
| 7,164,653 B1 * | 1/2007 | Bezoza | H04L 12/5601 370/468 |

(Continued)

FOREIGN PATENT DOCUMENTS

WO    2002013036 A1    2/2002

OTHER PUBLICATIONS

Gerald Gui et al. "Scaling Services with Shard Manager" posted Production Engineering on Aug. 24, 2020 (16 pages).

(Continued)

*Primary Examiner* — Backhean Tiv
(74) *Attorney, Agent, or Firm* — Finch & Maloney PLLC

(57) ABSTRACT

A computing device including a memory and a processor is provided. The processor is configured to receive, from a device configured to communicate data generated by at least one sensor disposed in a location being monitored, a request to establish a bi-directional connection between the device and a computing environment; identify a structure of data storing a uniform resource locator (URL) and a set of identifiers, the set of identifiers being representative of a group of connections with the computing environment; and respond, to the device, with a response specifying the URL, thereby enabling the device to establish the bi-directional connection.

20 Claims, 10 Drawing Sheets

(56) References Cited

U.S. PATENT DOCUMENTS

| | | | |
|---|---|---|---|
| 7,552,467 B2* | 6/2009 | Lindsay | G07F 7/1025 |
| | | | 713/168 |
| 8,392,553 B2* | 3/2013 | Petropoulakis | G06F 11/3006 |
| | | | 709/224 |
| 8,604,977 B2* | 12/2013 | Wilfert | G06Q 10/10 |
| | | | 709/219 |
| 8,812,727 B1* | 8/2014 | Sorenson, III | H04L 47/726 |
| | | | 709/239 |
| 9,373,207 B2 | 6/2016 | Ricci et al. | |
| 9,672,110 B1 | 6/2017 | Patel | |
| 10,104,077 B1 | 10/2018 | Irwan et al. | |
| 10,545,935 B2 | 1/2020 | Hegde et al. | |
| 10,782,677 B2 | 9/2020 | Zheng et al. | |
| 10,824,750 B2* | 11/2020 | De Lavarene | G06F 21/6218 |
| 10,909,211 B2* | 2/2021 | De Lavarene | G06F 16/217 |
| 11,151,124 B2 | 10/2021 | Wong et al. | |
| 11,158,177 B1 | 10/2021 | Elhattab et al. | |
| 11,323,884 B2 | 5/2022 | Lifshitz et al. | |
| 11,750,693 B1* | 9/2023 | Wilfert | H04L 67/12 |
| | | | 709/223 |
| 11,888,929 B1* | 1/2024 | Wilfert | H04L 67/1031 |
| 2012/0200711 A1* | 8/2012 | Dolin | H04N 7/181 |
| | | | 348/E7.085 |
| 2013/0166640 A1* | 6/2013 | Wilfert | G06F 16/9537 |
| | | | 709/204 |
| 2014/0280727 A1 | 9/2014 | Richards et al. | |
| 2014/0313882 A1 | 10/2014 | Rucker et al. | |
| 2015/0290808 A1* | 10/2015 | Renkis | H04N 13/275 |
| | | | 901/50 |
| 2016/0072713 A1 | 3/2016 | Mhatre et al. | |
| 2017/0064003 A1 | 3/2017 | Kubota | |
| 2017/0171305 A1* | 6/2017 | Jones | H04L 47/125 |
| 2017/0278368 A1 | 9/2017 | Burke | |
| 2019/0312873 A1* | 10/2019 | Katieb | H04L 9/40 |
| 2020/0128094 A1 | 4/2020 | De Lavarene et al. | |
| 2021/0144008 A1 | 5/2021 | Prager | |
| 2024/0163329 A1* | 5/2024 | Wilfert | H04L 67/02 |
| 2024/0163330 A1* | 5/2024 | Wilfert | H04L 67/101 |
| 2024/0163331 A1* | 5/2024 | Wilfert | H04L 69/163 |

OTHER PUBLICATIONS

Wikipedia: Load balancing (computing) https://web.archive.org/web/20221112080224/en.wikipedia.org/wiki/Load_balancing_(computing) captured by the Wayback Machine on Nov. 12, 2022 (17 pages).

International Search Report and Written Opinion mailed Mar. 15, 2024 for International Application No. PCT/US2023/078782, 8 pages.

* cited by examiner

LOAD BALANCING DEVICE CONNECTIONS

CROSS-REFERENCE TO RELATED APPLICATIONS

This application claims the benefit under 35 U.S.C. § 121 as a divisional of U.S. patent application Ser. No. 18/180,575, titled "LOAD BALANCING DEVICE CONNECTIONS," filed on Mar. 8, 2023, which claims the benefit under 35 U.S.C. § 120 as a continuation of U.S. patent application Ser. No. 18/055,652, titled "LOAD BALANCING DEVICE CONNECTIONS," filed on Nov. 15, 2022. Each of the applications cited above is hereby incorporated herein by reference in its entirety.

TECHNICAL FIELD

Aspects of the technologies described herein relate to security systems and methods.

BACKGROUND

Some monitoring systems use one or more cameras to capture images of areas around or within a residence or business location. Such monitoring systems can process images locally and transmit the captured images to a remote service. If motion is detected, the monitoring systems can send an alert to one or more user devices.

SUMMARY

This disclosure is directed to techniques for managing long-lived connections between devices and cloud computing services at the device connection layer. In at least one example, a method implemented by at least one computing device is provided. The method includes receiving, from a device configured to communicate data generated by at least one sensor disposed in a location being monitored, a request to establish a bi-directional connection between the device and a computing environment; identifying a structure of data storing a uniform resource locator (URL) and a set of identifiers, the set of identifiers being representative of a group of connections with the computing environment; and responding, to the device, with a response specifying the URL, thereby enabling the device to establish the bi-directional connection.

The method can incorporate one or more of the following features.

In the method, the group of connections can be a first group of connections distinct from a second group of connections with the computing environment, and the method can further include associating the first group of connections with a first queue distinct from a second queue associated with the second group of connections; receiving a message for the device; and routing the message to the first queue prior to communication of the message to the device.

In the method, the computing environment can be implemented by a plurality of servers comprising a first server and a second server, and the method can further include moving the group of connections from the first server to the second server.

The method can further include evaluating one or more rules to determine satisfaction of one or more performance priorities, wherein moving the group of connections comprises moving the group of connections in response to at least one rule of the one or more rule indicating that the computing environment does not meet performance priorities. The method can further include adding the second server to the computing environment prior to moving the group of connections from the first server to the second server.

The method can further include establishing the bi-directional connection between the device and the computing environment, the bi-directional connection comprising a TCP socket. In the method, the structure of data can store an identifier of a queue, and the method can further include dequeuing a message from the queue; and communicating the message to the device via the bi-directional connection.

In the method, identifying the URL can include determining that the group of connections has sufficient capacity available to support the bi-directional connection.

In the method, receiving, from the device, the request to establish a bi-directional connection can include receiving the request from one or more of a camera and a base station.

In at least one example, a method implemented by at least one computing device is provided. The method includes receiving, from a device configured to communicate data generated by at least one sensor disposed in a location being monitored, a request to establish a bi-directional connection between the device and a computing environment comprising a plurality of servers, individual servers of the plurality of servers supporting at least one group of connections; determining that no group of connections within the computing environment has capacity sufficient to support the bi-directional connection; adding a new group of connections to a server of the plurality of servers; and adding the bi-directional connection to the new group of connections.

The method can incorporate one or more of the following features.

The method can further include determining that the server of the plurality of servers has capacity sufficient to support the new group of connections and the bi-directional connection prior to adding the new group of connections. The method can further include determining that no server of the plurality of servers has capacity sufficient to support the bi-directional connection; and provisioning the server of the plurality of servers prior to adding the new group of connections.

The method can further include responding, to the device, with a uniform resource locator that identifies the new group of connections.

In the method, determining that no group of connections with computing environment has capacity sufficient to support the bi-directional connection can include calculating one or more metrics indicative of performance of a system comprising the device and the computing environment; and evaluating one or more rules using the one or more metrics.

In at least one example, a system of computing devices is provided. The system includes at least one computing including a memory and at least one processor coupled with the memory. The at least one processor is configured to receive, from a device configured to communicate data generated by at least one sensor disposed in a location being monitored, a request to establish a bi-directional connection between the device and a computing environment; identify a structure of data storing a uniform resource locator (URL) and a set of identifiers, the set of identifiers being representative of a group of connections with the computing environment; and respond, to the device, with a response specifying the URL, thereby enabling the device to establish the bi-directional connection.

The system of computing devices can incorporate one or more of the following features.

In the system, the group of connections can be a first group of connections distinct from a second group of connections with the computing environment, and the at least one processor can be further configured to associate the first group of connections with a first queue distinct from a second queue associated with the second group of connections; receive a message for the device; and route the message to the first queue prior to communication of the message to the device.

In the system, the computing environment can be implemented by a plurality of servers comprising a first server and a second server, the at least one processor can be further configured to move the group of connections from the first server to the second server. The at least one processor can be further configured to evaluate one or more rules to determine satisfaction of one or more performance priorities, wherein to move the group of connections comprises to move the group of connections in response to at least one rule of the one or more rule indicating that the computing environment does not meet performance priorities. The at least one processor can be is further configured to add the second server to the computing environment prior to moving the group of connections from the first server to the second server.

In the system, the at least one processor can be further configured to establish the bi-directional connection between the device and the computing environment, the bi-directional connection comprising a TCP socket.

BRIEF DESCRIPTION OF THE DRAWINGS

Additional examples of the disclosure, as well as features and advantages thereof, will become more apparent by reference to the description herein taken in conjunction with the accompanying drawings which are incorporated in and constitute a part of this disclosure. The figures are not necessarily drawn to scale.

DETAILED DESCRIPTION

Figure 1:
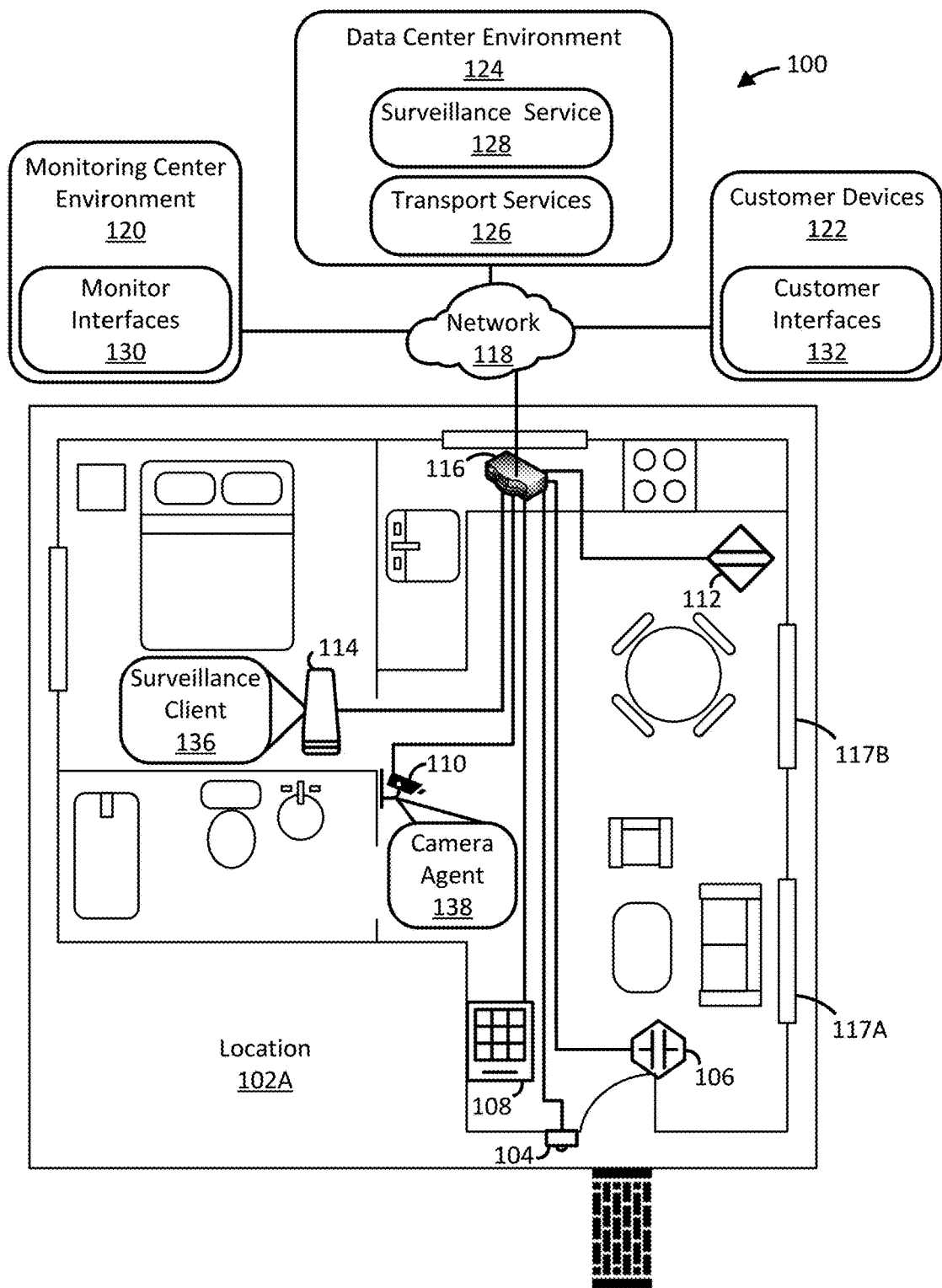
FIG. 1 is a schematic diagram of a security system, according to some examples described herein.

As summarized above, at least some examples disclosed herein are directed to systems and processes that actively balance message handling load on a cloud-based service by bundling device connections through which the messages are communicated into groups and distributing the groups among a set of servers tasked with processing the messages. These groups of connections may be referred to herein as shards. Through the use of shards, some example transport services disclosed herein benefit from efficiencies of scale resulting from managing hundreds or thousands of connections within a single group while preserving a sufficient granularity of message processing load to effectively balance the same. The ability to segment and balance message processing load makes the systems and processes described herein particularly well suited for Internet of Things (IoT) systems in which long-lived connections (e.g., connections through which several messages are exchanged or that otherwise remain open for at least several seconds, minutes, or even hours) to IoT devices are prevalent.

The shard-based processing techniques disclosed herein solve several problems present in other message handling technologies. While message queuing telemetry transport (MQTT) has become a highly utilized protocol in IoT systems, MQTT is not well suited for IoT systems with a large number of connected IoT devices (e.g., more than 500,000). In IoT systems that utilize MQTT, all servers are tasked with publishing messages for all topics, so an IoT device can receive messages for all subscribed topics from any server. This approach does not scale well to large numbers of IoT devices, especially where connections to the IoT devices are long-lived, because every server must be able to service all IoT devices.

Traditional load balancing techniques used in cloud computing include the Least Connection method, the Least Response Time method, the Round Robin method, and the internet protocol (IP) Hash method to name a few. While these techniques have been successfully utilized in various IoT systems, they are prone to uneven distributions when dealing with long-lived connections. These uneven distributions can result in overutilization of some servers and underutilization of others. Moreover, traditional load balancing techniques have no provision to reshuffle if load becomes unbalanced.

To remedy these shortcomings, among others, shard-based techniques for managing server load at the device connection layer are provided. These shard-based processing techniques manage load across a group of servers that have long-lived connections to geographically dispersed computing devices. Moreover, the shard-based processing techniques described herein guarantee message delivery with a time-to-live over an unreliable network and minimize server-to-server traffic while routing billions of messages daily.

For instance, some examples described herein are directed to a transport service that utilizes shards to balance message handling load at a device connection layer within the communication stack of a security system. In certain examples, a shard is an associative mechanism that bundles multiple (e.g., 5,000 or more) connections between the transport service and remote computing devices into a cohort or set that can be managed by a shard manager and serviced by the shard servers as a single, cohesive unit. The connections bundled together in a shard may be bi-directional connections. In some examples, a shard is a data structure configured to store a uniform resource locator (URL) that identifies the shard and that is monitored by a shard server that hosts the shard. The shard data structure can be further configured to store identifiers of connections that belong to the shard, and identifiers of queues that hold messages with routing that involves the connections of the shard. In some examples, the queues are durable and store messages until their time-to-live duration has expired. In addition to hosting shards, the shard servers process messages for the shards by accessing their queues and attempting to communicate the messages stored therein to the messages' recipients (e.g., processes hosted by the remote computing devices or other processes hosted by other devices in the security system). In certain examples, the shard servers will repeatedly attempt to communicate messages, where the recipient was unavailable during a previous attempt, until their time-to-live duration has expired.

In some examples, the shard manager can create, destroy, or move shards between shard servers to balance message processing load. The shard manager may execute these load balancing operations in response to detection of an event that indicates the same is warranted. Examples of such an event include expiration of a load-balancing timer, receipt of a balancing request, failure of a shard server, and/or one or more system performance priorities not being met. This active approach to load balancing helps to overcome some of the shortcomings pointed out in the MQTT-based systems and load balancing techniques described above particularly with regard to long-lived connections.

Whereas various examples are described herein, it will be apparent to those of ordinary skill in the art that many more examples and implementations are possible. Accordingly, the examples described herein are not the only possible examples and implementations. Furthermore, the advantages described above are not necessarily the only advantages, and it is not necessarily expected that all of the described advantages will be achieved with every example.

For the purposes of promoting an understanding of the principles of the present disclosure, reference will now be made to the examples illustrated in the drawings, and specific language will be used to describe the same. It will nevertheless be understood that no limitation of the scope of the examples described herein is thereby intended.

FIG. 1 is a schematic diagram of a security system 100 configured to monitor geographically disparate locations in accordance with some examples. As shown in FIG. 1, the system 100 includes a monitored location 102A, a monitoring center environment 120, a data center environment 124, one or more customer devices 122, and a communication network 118. Each of the monitored location 102A, the monitoring center 120, the data center 124, the one or more customer devices 122, and the communication network 118 include one or more computing devices (e.g., as described below with reference to FIG. 11). The one or more customer devices 122 are configured to host one or more customer interface applications 132. The monitoring center environment 120 is configured to host one or more monitor interface applications 130. The data center environment 124 is configured to host a surveillance service 128 and one or more transport services 126. The location 102A includes image capture devices 104 and 110, a contact sensor assembly 106, a keypad 108, a motion sensor assembly 112, a base station 114, and a router 116. The base station 114 hosts a surveillance client 136. The image capture device 110 hosts a camera agent 138. The security devices disposed at the location 102A (e.g., devices 104, 106, 108, 110, 112, and 114) may be referred to herein as location-based devices.

In some examples, the router 116 is a wireless router that is configured to communicate with the location-based devices via communications that comport with a communications standard such as any of the various Institute of Electrical and Electronics Engineers (IEEE) 802.11 standards. As illustrated in FIG. 1, the router 116 is also configured to communicate with the network 118. It should be noted that the router 116 implements a local area network (LAN) within and proximate to the location 102A by way of example only. Other networking technology that involves other computing devices is suitable for use within the location 102A. For instance, in some examples, the base station 114 can receive and forward communication packets transmitted by the image capture device 110 via a point-to-point personal area network (PAN) protocol, such as BLUETOOTH. Other wired, wireless, and mesh network technology and topologies will be apparent with the benefit of this disclosure and are intended to fall within the scope of the examples disclosed herein.

Continuing with the example of FIG. 1, the network 118 can include one or more public and/or private networks that support, for example, IP. The network 118 may include, for example, one or more LANs, one or more PANs, and/or one or more wide area networks (WANs). The LANs can include wired or wireless networks that support various LAN standards, such as a version of IEEE 802.11 and the like. The PANs can include wired or wireless networks that support various PAN standards, such as BLUETOOTH, ZIGBEE, and the like. The WANs can include wired or wireless networks that support various WAN standards, such as the Code Division Multiple Access (CMDA) radio standard, the Global System for Mobiles (GSM) radio standard, and the like. The network 118 connects and enables data communication between the computing devices within the location 102A, the monitoring center environment 120, the data center environment 124, and the customer devices 122. In at least some examples, both the monitoring center environment 120 and the data center environment 124 include network equipment (e.g., similar to the router 116) that is configured to communicate with the network 118 and computing devices collocated with or near the network equipment. It should be noted that, in some examples, the network 118 and the network extant within the location 102A support other communication protocols, such as MQTT or other IoT protocols.

Continuing with the example of FIG. 1, the data center environment 124 can include physical space, communications, cooling, and power infrastructure to support networked operation of computing devices. For instance, this infrastructure can include rack space into which the computing devices are installed, uninterruptible power supplies, cooling plenum and equipment, and networking devices. The data center environment 124 can be dedicated to the security system 100, can be a non-dedicated, commercially available cloud computing service (e.g., MICROSOFT AZURE, AMAZON WEB SERVICES, GOOGLE CLOUD, or the like), or can include a hybrid configuration made up of dedicated and non-dedicated resources. Regardless of its physical or logical configuration, as shown in FIG. 1, the data center environment 124 is configured to host the surveillance service 128 and the transport services 126.

Continuing with the example of FIG. 1, the monitoring center environment 120 can include a plurality of computing devices (e.g., desktop computers) and network equipment (e.g., one or more routers) connected to the computing devices and the network 118. The customer devices 122 can include personal computing devices (e.g., a desktop computer, laptop, tablet, smartphone, or the like) and network equipment (e.g., a router, cellular modem, cellular radio, or the like). As illustrated in FIG. 1, the monitoring center environment 120 is configured to host the monitor interfaces 130 and the customer devices 122 are configured to host the customer interfaces 132.

Continuing with the example of FIG. 1, the devices 104, 106, 110, and 112 are configured to acquire analog signals via sensors incorporated into the devices, generate digital sensor data based on the acquired signals, and communicate (e.g. via a wireless link with the router 116) the sensor data to the base station 114. The type of sensor data generated and communicated by these devices varies along with the type of sensors included in the devices. For instance, the image capture devices 104 and 110 can acquire ambient light, generate frames of image data based on the acquired light, and communicate the frames to the base station 114, the monitor interfaces 130, and/or the customer interfaces 132, although the pixel resolution and frame rate may vary depending on the capabilities of the devices. As shown in FIG. 1, the image capture device 104 has an FOV that originates proximal to a front door of the location 102A and can acquire images of a walkway, highway, and a space between the location 102A and the highway. The image capture device 110 has an FOV that originates proximal to a bathroom of the location 102A and can acquire images of a living room and dining area of the location 102A. The image capture device 110 can further acquire images of outdoor areas beyond the location 102A through windows 117A and 117B on the right side of the location 102A.

Further, as shown in FIG. 1, in some examples the image capture device 110 is configured to communicate with the surveillance service 128, the monitor interfaces 130, and the customer interfaces 132 separately from the surveillance client 136 via execution of the camera agent 138. These communications can include sensor data generated by the image capture device 110 and/or commands to be executed by the image capture device 110 sent by the surveillance service 128, the monitor interfaces 130, and/or the customer interfaces 132. The commands can include, for example, requests for interactive communication sessions in which monitoring personnel and/or customers interact with the image capture device 110 via the monitor interfaces 130 and the customer interfaces 132. These interactions can include requests for the image capture device 110 to transmit additional sensor data and/or requests for the image capture device 110 to render output via a user interface (e.g., the user interface 412 of FIG. 4). This output can include audio and/or video output.

Continuing with the example of FIG. 1, the contact sensor assembly 106 includes a sensor that can detect the presence or absence of a magnetic field generated by a magnet when the magnet is proximal to the sensor. When the magnetic field is present, the contact sensor assembly 106 generates Boolean sensor data specifying a closed state. When the magnetic field is absent, the contact sensor assembly 106 generates Boolean sensor data specifying an open state. In either case, the contact sensor assembly 106 can communicate sensor data indicating whether the front door of the location 102A is open or closed to the base station 114. The motion sensor assembly 112 can include an audio emission device that can radiate sound (e.g., ultrasonic) waves and an audio sensor that can acquire reflections of the waves. When the audio sensor detects the reflection because no objects are in motion within the space monitored by the audio sensor, the motion sensor assembly 112 generates Boolean sensor data specifying a still state. When the audio sensor does not detect a reflection because an object is in motion within the monitored space, the motion sensor assembly 112 generates Boolean sensor data specifying an alert state. In either case, the motion sensor assembly 112 can communicate the sensor data to the base station 114. It should be noted that the specific sensing modalities described above are not limiting to the present disclosure. For instance, as one of many potential examples, the motion sensor assembly 112 can base its operation on acquisition of changes in temperature rather than changes in reflected sound waves.

Continuing with the example of FIG. 1, the keypad 108 is configured to interact with a user and interoperate with the other location-based devices in response to interactions with the user. For instance, in some examples, the keypad 108 is configured to receive input from a user that specifies one or more commands and to communicate the specified commands to one or more addressed processes. These addressed processes can include processes implemented by one or more of the location-based devices and/or one or more of the monitor interfaces 130 or the surveillance service 128. The commands can include, for example, codes that authenticate the user as a resident of the location 102A and/or codes that request activation or deactivation of one or more of the location-based devices. Alternatively or additionally, in some examples, the keypad 108 includes a user interface (e.g., a tactile interface, such as a set of physical buttons or a set of virtual buttons on a touchscreen) configured to interact with a user (e.g., receive input from and/or render output to the user). Further still, in some examples, the keypad 108 can receive respond to the communicated commands and render the responses via the user interface as visual or audio output.

Continuing with the example of FIG. 1, the base station 114 is configured to interoperate with the other location-based devices to provide local command and control and store-and-forward functionality via execution of the surveillance client 136. In some examples, to implement store-and-forward functionality, the base station 114, through execution of the surveillance client 136, receives sensor data, packages the data for transport, and stores the packaged sensor data in local memory for subsequent communication. This communication of the packaged sensor data can include, for instance, transmission of the packaged sensor data as a payload of a message to one or more of the transport services 126 when a communication link to the transport services 126 via the network 118 is operational. In some examples, packaging the sensor data can include filtering the sensor data and/or generating one or more summaries (maximum values, average values, changes in values since the previous communication of the same, etc.) of multiple sensor readings. To implement local command and control functionality, the base station 114 executes, under control of the surveillance client 136, a variety of programmatic operations in response to various events. Examples of these events can include reception of commands from the keypad 108 or the customer interface application 132, reception of commands from one of the monitor interfaces 130 or the customer interface application 132 via the network 118, or detection of the occurrence of a scheduled event. The programmatic operations executed by the base station 114 under control of the surveillance client 136 can include activation or deactivation of one or more of the devices 104, 106, 108, 110, and 112; sounding of an alarm; reporting an event to the surveillance service 128; and communicating location data to one or more of the transport services 126 to name a few operations. The location data can include data specifying sensor readings (sensor data), configuration data of any of the location-based devices, commands input and received from a user (e.g., via the keypad 108 or a customer interface 132), or data derived from one or more of these data types (e.g., filtered sensor data, summarizations of sensor data, event data specifying an event detected at the location via the sensor data, etc).

Continuing with the example of FIG. 1, the transport services 126 are configured to securely, reliably, and efficiently exchange messages between processes implemented by the location-based devices and processes implemented by other devices in the system 100. These other devices can include the customer devices 122, devices disposed in the data center environment 124, and/or devices disposed in the monitoring center environment 120. In some examples, the transport services 126 are also configured to parse messages from the location-based devices to extract payloads included therein and store the payloads and/or data derived from the payloads within one or more data stores hosted in the data center environment 124. The data housed in these data stores may be subsequently accessed by, for example, the surveillance service 128, the monitor interfaces 130, and the customer interfaces 132.

In certain examples, the transport services 126 expose and implement one or more application programming interfaces (APIs) that are configured to receive, process, and respond to calls from processes (e.g., the surveillance client 136) implemented by base stations (e.g., the base station 114) and/or processes (e.g., the camera agent 138) implemented by other devices (e.g., the image capture device 110). Individual instances of a transport service within the transport services 126 can be associated with and specific to certain manufactures and models of location-based monitoring equipment (e.g., SIMPLISAFE equipment, RING equipment, etc.). The APIs can be implemented using a variety of architectural styles and interoperability standards. For instance, in one example, the API is a web services interface implemented using a representational state transfer (REST) architectural style. In this example, API calls are encoded in Hypertext Transfer Protocol (HTTP) along with JavaScript Object Notation (JSON) and/or extensible markup language (XML). These API calls are addressed to one or more uniform resource locators (URLs) that are API endpoints monitored by the transport services 126. In some examples, portions of the HTTP communications are encrypted to increase security. Alternatively or additionally, in some examples, the API is implemented as an MQTT broker that receives messages and transmits responsive messages to MQTT clients hosted by the base stations and/or the other devices. Alternatively or additionally, in some examples, the API is implemented using simple file transfer protocol commands. Thus, the transport services 126 are not limited to a particular protocol or architectural style. One example of the transport services 126 that utilize shard servers and associated queues to balance message handling load is described further below with reference to 7-10. It should be noted that, in at least some examples, the transport services 126 can transmit one or more API calls to location-based devices to request data from, or an interactive communication session with, the location-based devices.

Continuing with the example of FIG. 1, the surveillance service 128 is configured to control overall logical setup and operation of the system 100. As such, the surveillance service 128 can interoperate with the transport services 126, the monitor interfaces 130, the customer interfaces 132, and any of the location-based devices. In some examples, the surveillance service 128 is configured to monitor data from a variety of sources for reportable events (e.g., a break-in event) and, when a reportable event is detected, notify one or more of the monitor interfaces 130 and/or the customer interfaces 132 of the reportable event. In some examples, the surveillance service 128 is also configured to maintain state information regarding the location 102A. This state information can indicate, for instance, whether the location 102A is safe or under threat. In certain examples, the surveillance service 128 is configured to change the state information to indicate that the location 102A is safe only upon receipt of a communication indicating a clear event (e.g., rather than making such a change in response to discontinuation of reception of break-in events). This feature can prevent a "crash and smash" robbery from being successfully executed. Further example processes that the surveillance service 128 is configured to execute are described below with reference to FIGS. 5 and 6.

Continuing with the example of FIG. 1, individual monitor interfaces 130 are configured to control computing device interaction with monitoring personnel and to execute a variety of programmatic operations in response to the interactions. For instance, in some examples, the monitor interface 130 controls its host device to provide information regarding reportable events detected at monitored locations, such as the location 102A, to monitoring personnel. Such events can include, for example, movement or an alert condition generated by one or more of the location-based devices. Alternatively or additionally, in some examples, the monitor interface 130 controls its host device to interact with a user to configure features of the system 100. Further example processes that the monitor interface 130 is configured to execute are described below with reference to FIG. 6.

Continuing with the example of FIG. 1, individual customer interfaces 132 are configured to control computing device interaction with a customer and to execute a variety of programmatic operations in response to the interactions. For instance, in some examples, the customer interface 132 controls its host device to provide information regarding reportable events detected at monitored locations, such as the location 102A, to the customer. Such events can include, for example, movement within an intruder zone or an alert condition generated by one or more of the location-based devices. Alternatively or additionally, in some examples, the customer interface 132 is configured to process input received from the customer to activate or deactivate one or more of the location-based devices. Further still, in some examples, the customer interface 132 configures features of the system 100 in response to input from a user. Further example processes that the customer interface 132 is configured to execute are described below with reference to FIG. 6.

Figures 2, 3:
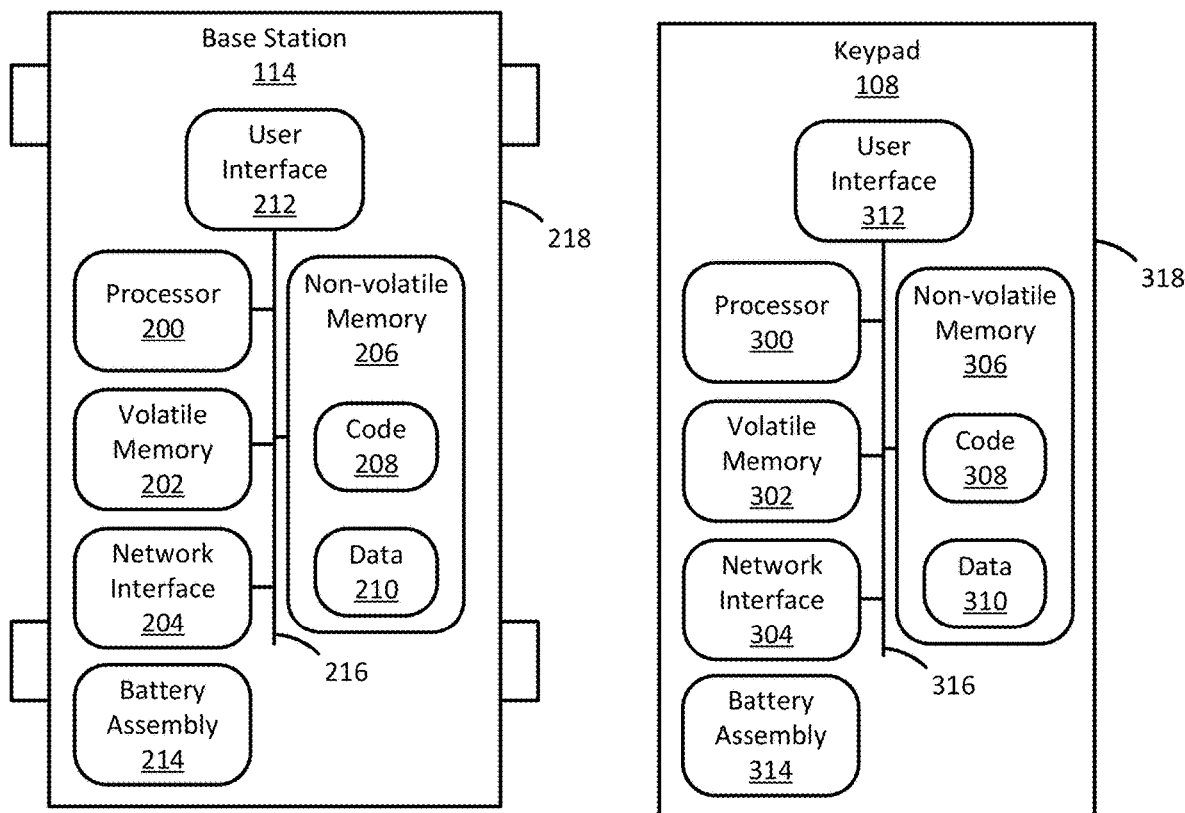
FIG. 2 is a schematic diagram of a base station, according to some examples described herein.
FIG. 3 is a schematic diagram of a keypad, according to some examples described herein.

Turning now to FIG. 2, an example base station 114 is schematically illustrated. As shown in FIG. 2, the base station 114 includes at least one processor 200, volatile memory 202, non-volatile memory 206, at least one network interface 204, a user interface 212, a battery assembly 214, and an interconnection mechanism 216. The non-volatile memory 206 stores executable code 208 and includes a data store 210. In some examples illustrated by FIG. 2, the features of the base station 114 enumerated above are incorporated within, or are a part of, a housing 218.

In some examples, the non-volatile (non-transitory) memory 206 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 208 stored in the non-volatile memory can include an operating system and one or more applications or programs that are configured to execute under the operating system. Alternatively or additionally, the code 208 can include specialized firmware and embedded software that is executable without dependence upon a commercially available operating system. Regardless, execution of the code 208 can implement the surveillance client 136 of FIG. 1 and can result in manipulated data that is a part of the data store 210.

Continuing the example of FIG. 2, the processor 200 can include one or more programmable processors to execute one or more executable instructions, such as a computer program specified by the code 208, to control the operations of the base station 114. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 202) and executed by the circuitry. In some examples, the processor 200 is a digital processor, but the processor 200 can be analog, digital, or mixed. As such, the processor 200 can execute the function, operation, or sequence of operations using digital values and/or using analog signals. In some examples, the processor 200 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 200 that are multicore can provide functionality for parallel, simultaneous execution of instructions or for parallel, simultaneous execution of one instruction on more than one piece of data.

Continuing with the example of FIG. 2, prior to execution of the code 208 the processor 200 can copy the code 208 from the non-volatile memory 206 to the volatile memory 202. In some examples, the volatile memory 202 includes one or more static or dynamic random access memory (RAM) chips and/or cache memory (e.g. memory disposed on a silicon die of the processor 200). Volatile memory 202 can offer a faster response time than a main memory, such as the non-volatile memory 206.

Through execution of the code 208, the processor 200 can control operation of the network interface 204. For instance, in some examples, the network interface 204 includes one or more physical interfaces (e.g., a radio, an ethernet port, a universal serial bus (USB) port, etc.) and a software stack including drivers and/or other code 208 that is configured to communicate with the one or more physical interfaces to support one or more LAN, PAN, and/or WAN standard communication protocols. The communication protocols can include, for example, transmission control protocol (TCP), user datagram protocol (UDP), HTTP, and MQTT among others. As such, the network interface 204 enables the base station 114 to access and communicate with other computing devices (e.g., the location-based devices) via a computer network (e.g., the LAN established by the router 116 of FIG. 1, the network 118 of FIG. 1, and/or a point-to-point connection). For instance, in at least one example, the network interface 204 utilizes sub-GHz wireless networking to transmit wake messages to the other computing devices to request streams of sensor data or other operations. Use of sub-GHz wireless networking can improve operable communication distances and/or reduce power consumed to communicate.

Through execution of the code 208, the processor 200 can control operation of the user interface 212. For instance, in some examples, the user interface 212 includes user input and/or output devices (e.g., a keyboard, a mouse, a touchscreen, a display, a speaker, a camera, an accelerometer, a biometric scanner, an environmental sensor, etc.) and a software stack including drivers and/or other code 208 that is configured to communicate with the user input and/or output devices. For instance, the user interface 212 can be implemented by a customer device 122 hosting a mobile application (e.g., a customer interface 132). The user interface 212 enables the base station 114 to interact with users to receive input and/or render output. This rendered output can include, for instance, one or more graphical user interfaces (GUIs) including one or more controls configured to display output and/or receive input. The input can specify values to be stored in the data store 210. The output can indicate values stored in the data store 210. It should be noted that, in some examples, parts of the user interface 212 are accessible and/or visible as part of, or through, the housing 218. These parts of the user interface 212 can include, for example, one or more light-emitting diodes (LEDs). Alternatively or additionally, in some examples, the user interface 212 includes a 95 db siren that the processor 200 sounds to indicate that a break-in event has been detected.

Continuing with the example of FIG. 2, the various features of the base station 114 described above can communicate with one another via the interconnection mechanism 216. In some examples, the interconnection mechanism 216 includes a communications bus. In addition, in some examples, the battery assembly 214 is configured to supply operational power to the various features of the base station 114 described above. In some examples, the battery assembly 214 includes at least one rechargeable battery (e.g., one or more NiMH or lithium batteries). In some examples, the rechargeable battery has a runtime capacity sufficient to operate the base station 114 for 24 hours or longer while the base station 114 is disconnected from or otherwise not receiving line power. Alternatively or additionally, in some examples, the battery assembly 214 includes power supply circuitry to receive, condition, and distribute line power to both operate the base station 114 and recharge the rechargeable battery. The power supply circuitry can include, for example, a transformer and a rectifier, among other circuitry, to convert AC line power to DC device and recharging power.

Turning now to FIG. 3, an example keypad 108 is schematically illustrated. As shown in FIG. 3, the keypad 108 includes at least one processor 300, volatile memory 302, non-volatile memory 306, at least one network interface 304, a user interface 312, a battery assembly 314, and an interconnection mechanism 316. The non-volatile memory 306 stores executable code 308 and data store 310. In some examples illustrated by FIG. 3, the features of the keypad 108 enumerated above are incorporated within, or are a part of, a housing 318.

In some examples, the respective descriptions of the processor 200, the volatile memory 202, the non-volatile memory 206, the interconnection mechanism 216, and the battery assembly 214 with reference to the base station 114 are applicable to the processor 300, the volatile memory 302, the non-volatile memory 306, the interconnection mechanism 316, and the battery assembly 314 with reference to the keypad 108. As such, those descriptions will not be repeated.

Continuing with the example of FIG. 3, through execution of the code 308, the processor 300 can control operation of the network interface 304. In some examples, the network interface 304 includes one or more physical interfaces (e.g., a radio, an ethernet port, a USB port, etc.) and a software stack including drivers and/or other code 308 that is configured to communicate with the one or more physical interfaces to support one or more LAN, PAN, and/or WAN standard communication protocols. These communication protocols can include, for example, TCP, UDP, HTTP, and MQTT among others. As such, the network interface 304 enables the keypad 108 to access and communicate with other computing devices (e.g., the other location-based devices) via a computer network (e.g., the LAN established by the router 116 and/or a point-to-point connection).

Continuing with the example of FIG. 3, through execution of the code 308, the processor 300 can control operation of the user interface 312. In some examples, the user interface 312 includes user input and/or output devices (e.g., physical keys arranged as a keypad, a touchscreen, a display, a speaker, a camera, a biometric scanner, an environmental sensor, etc.) and a software stack including drivers and/or other code 308 that is configured to communicate with the user input and/or output devices. As such, the user interface 312 enables the keypad 108 to interact with users to receive input and/or render output. This rendered output can include, for instance, one or more GUIs including one or more controls configured to display output and/or receive input. The input can specify values to be stored in the data store 310. The output can indicate values stored in the data store 310. It should be noted that, in some examples, parts of the user interface 312 (e.g., one or more LEDs) are accessible and/or visible as part of, or through, the housing 318.

Figure 4A:
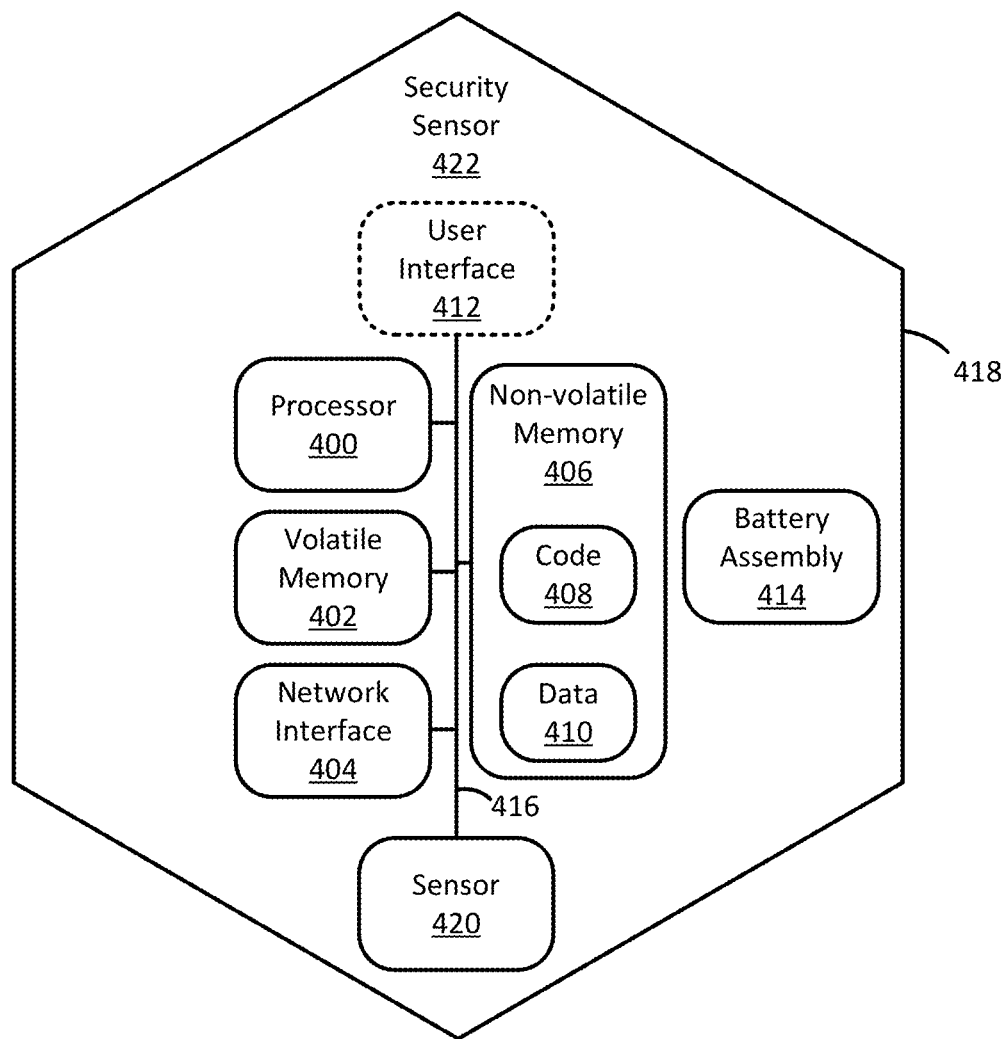
FIG. 4A is a schematic diagram of a security sensor, according to some examples described herein.

Turning now to FIG. 4A, an example security sensor 422 is schematically illustrated. Particular configurations of the security sensor 422 (e.g., the image capture devices 104 and 110, the motion sensor assembly 112, and the contact sensor assemblies 106) are illustrated in FIG. 1 and described above. As shown in FIG. 4A, the security sensor 422 includes at least one processor 400, volatile memory 402, non-volatile memory 406, at least one network interface 404, a battery assembly 414, an interconnection mechanism 416, and at least one sensor assembly 420. The non-volatile memory 406 stores executable code 408 and data store 410. Some examples include a user interface 412. In certain examples illustrated by FIG. 4A, the features of the security sensor 422 enumerated above are incorporated within, or are a part of, a housing 418.

In some examples, the respective descriptions of the processor 200, the volatile memory 202, the non-volatile memory 206, the interconnection mechanism 216, and the battery assembly 214 with reference to the base station 114 are applicable to the processor 400, the volatile memory 402, the non-volatile memory 406, the interconnection mechanism 416, and the battery assembly 414 with reference to the security sensor 422. As such, those descriptions will not be repeated here.

Continuing with the example of FIG. 4A, through execution of the code 408, the processor 400 can control operation of the network interface 404. In some examples, the network interface 404 includes one or more physical interfaces (e.g., a radio (including an antenna), an ethernet port, a USB port, etc.) and a software stack including drivers and/or other code 408 that is configured to communicate with the one or more physical interfaces to support one or more LAN, PAN, and/or WAN standard communication protocols. The communication protocols can include, for example, TCP, UDP, HTTP, and MQTT among others. As such, the network interface 404 enables the security sensor 422 to access and communicate with other computing devices (e.g., the other location-based devices) via a computer network (e.g., the LAN established by the router 116 and/or a point-to-point connection). For instance, in at least one example, when executing the code 408, the processor 400 controls the network interface to stream (e.g., via UDP) sensor data acquired from the sensor assembly 420 to the base station 114. Alternatively or additionally, in at least one example, through execution of the code 408, the processor 400 can control the network interface 404 to enter a power conservation mode by powering down a 2.4 GHz radio and powering up a sub-GHz radio that are both included in the network interface 404. In this example, through execution of the code 408, the processor 400 can control the network interface 404 to enter a streaming or interactive mode by powering up a 2.4 GHz radio and powering down a sub-GHz radio, for example, in response to receiving a wake signal from the base station via the sub-GHz radio.

Continuing with the example of FIG. 4A, through execution of the code 408, the processor 400 can control operation of the user interface 412. In some examples, the user interface 412 includes user input and/or output devices (e.g., physical buttons, a touchscreen, a display, a speaker, a camera, an accelerometer, a biometric scanner, an environmental sensor, one or more LEDs, etc.) and a software stack including drivers and/or other code 408 that is configured to communicate with the user input and/or output devices. As such, the user interface 412 enables the security sensor 422 to interact with users to receive input and/or render output. This rendered output can include, for instance, one or more GUIs including one or more controls configured to display output and/or receive input. The input can specify values to be stored in the data store 410. The output can indicate values stored in the data store 410. It should be noted that, in some examples, parts of the user interface 412 are accessible and/or visible as part of, or through, the housing 418.

Continuing with the example of FIG. 4A, the sensor assembly 420 can include one or more types of sensors, such as the sensors described above with reference to the image capture devices 104 and 110, the motion sensor assembly 112, and the contact sensor assembly 106 of FIG. 1, or other types of sensors. For instance, in at least one example, the sensor assembly 420 includes an image sensor (e.g., a charge-coupled device or an active-pixel sensor) and a temperature sensor. Regardless of the type of sensor or sensors housed, the processor 400 can (e.g., via execution of the code 408) acquire sensor data from the housed sensor and stream the acquired sensor data to the processor 400 for communication to the base station.

It should be noted that, in some examples of the devices 108 and 422, the operations executed by the processors 300 and 400 while under control of respective control of the code 308 and 408 may be hardcoded and/or implemented in hardware, rather than as a combination of hardware and software. Moreover, execution of the code 408 can implement the camera agent 138 of FIG. 1 and can result in manipulated data that is a part of the data store 410.

Figure 4B:
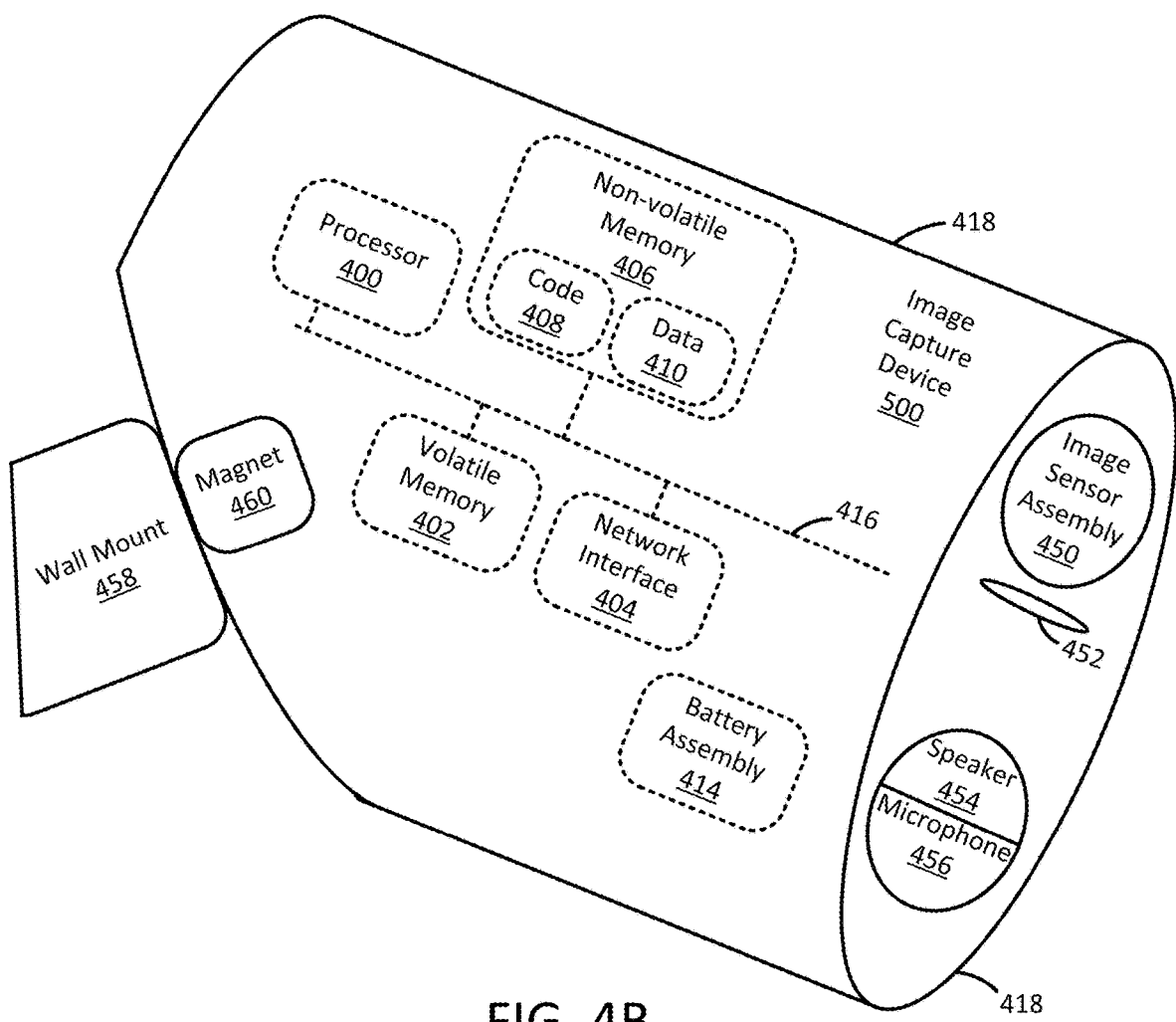
FIG. 4B is a schematic diagram of a security sensor, according to some examples described herein.

Turning now to FIG. 4B, an example image capture device 500 is schematically illustrated. Particular configurations of the image capture device 500 (e.g., the image capture devices 104 and 110) are illustrated in FIG. 1 and described above. As shown in FIG. 4B, the image capture device 500 includes at least one processor 400, volatile memory 402, non-volatile memory 406, at least one network interface 404, a battery assembly 414, and an interconnection mechanism 416. These features of the image capture device are illustrated in dashed lines to indicate that they reside within a housing 418. The non-volatile memory 406 stores executable code 408 and data store 410.

Some examples further include an image sensor assembly 450, a light 452, a speaker 454, a microphone 456, a wall mount 458, and a magnet 460. The image sensor assembly 450 may include a lens and an image sensor. The light 452 may include a light emitting diode (LED), such as a red-green-blue emitting LED. The light 452 may also include an infrared emitting diode in some examples. The speaker 454 may include a transducer configured to emit sound in the range of 60 dB to 80 dB or louder. Further, in some examples, the speaker 454 can include a siren configured to emit sound in the range of 70 dB to 90 db or louder. The microphone 456 may include a micro electro-mechanical system (MEMS) microphone. The wall mount 458 may include a mounting bracket, configured to accept screws or other fasteners that adhere the bracket to a wall, and a cover configured to mechanically couple to the mounting bracket. In some examples, the cover is composed of a magnetic material, such as aluminum or stainless steel, to enable the magnet 460 to magnetically couple to the wall mount 458, thereby holding the image capture device 500 in place.

In some examples, the respective descriptions of the processor 400, the volatile memory 402, the network interface 404, the non-volatile memory 406, the code 408 with respect to the network interface 404, the interconnection mechanism 416, and the battery assembly 414 with reference to the security sensor 422 are applicable these same features with reference to the image capture device 500. As such, those descriptions will not be repeated here.

Continuing with the example of FIG. 4B, through execution of the code 408, the processor 400 can control operation of the image sensor assembly 450, the light 452, the speaker 454, and the microphone 456. For instance, in at least one example, when executing the code 408, the processor 400 controls the image sensor assembly 450 to acquire sensor data, in the form of image data, to be stream to the base station 114 (or one of the processes 130, 128, or 132 of FIG. 1) via the network interface 404. Alternatively or additionally, in at least one example, through execution of the code 408, the processor 400 controls the light 452 to emit light so that the image sensor assembly 450 collects sufficient reflected light to compose the image data. Further, in some examples, through execution of the code 408, the processor 400 controls the speaker 454 to emit sound. This sound may be locally generated (e.g., a sonic alert via the siren) or streamed from the base station 114 (or one of the processes 130, 128 or 132 of FIG. 1) via the network interface 404 (e.g., utterances from the user or monitoring personnel). Further still, in some examples, through execution of the code 408, the processor 400 controls the microphone 456 to acquire sensor data in the form of sound for streaming to the base station 114 (or one of the processes 130, 128 or 132 of FIG. 1) via the network interface 404.

It should be appreciated that in the example of FIG. 4B, the light 452, the speaker 454, and the microphone 456 implement an instance of the user interface 412 of FIG. 4A. It should also be appreciated that the image sensor assembly 450 and the light 452 implement an instance of the sensor assembly 420 of FIG. 4A.

Figure 5:
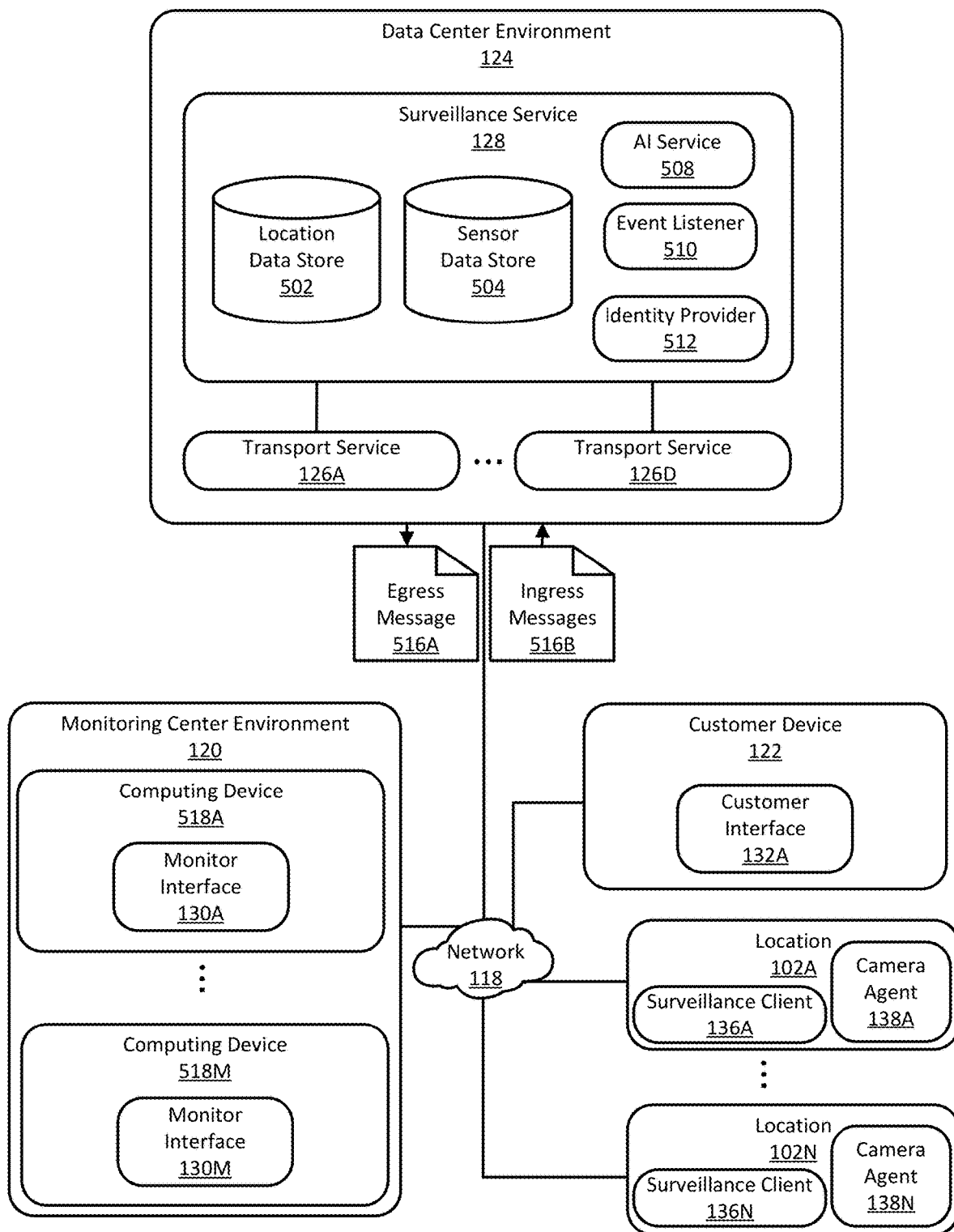
FIG. 5 is a schematic diagram of a data center environment, a monitoring center environment, and a customer device, according to some examples described herein.

Turning now to FIG. 5, aspects of the data center environment 124 of FIG. 1, the monitoring center environment 120 of FIG. 1, one of the customer devices 122 of FIG. 1, the network 118 of FIG. 1, and a plurality of monitored locations 102A of FIG. 1 through 102N (collectively referred to as the locations 102) are schematically illustrated. As shown in FIG. 5, the data center environment 124 hosts the surveillance service 128 and the transport services 126 (individually referred to as the transport services 126A through 126D). The surveillance service 128 includes a location data store 502, a sensor data store 504, an artificial intelligence (AI) service 508, an event listening service 510, and an identity provider 512. The monitoring center environment 120 includes computing devices 518A through 518M (collectively referred to as the computing devices 518) that host monitor interfaces 130A through 130M. Individual locations 102A through 102N include base stations (e.g., the base station 114 of FIG. 1, not shown) that host the surveillance clients 136A through 136N (collectively referred to as the surveillance clients 136) and image capture devices (e.g., the image capture device 110 of FIG. 1, not shown) that host the software camera agents 138A through 138N (collectively referred to as the camera agents 138).

As shown in FIG. 5, the transport services 126 are configured to process ingress messages 5166 from the customer interface 132A, the surveillance clients 136, the camera agents 138, and/or the monitor interfaces 130. The transport services 126 are also configured to process egress messages 516A addressed to the customer interface 132A, the surveillance clients 136, the camera agents 138, and the monitor interfaces 130. The location data store 502 is configured to store, within a plurality of records, location data in association with identifiers of customers for whom the location is monitored. For example, the location data may be stored in a record with an identifier of a customer and/or an identifier of the location to associate the location data with the customer and the location. The sensor data store 504 is configured to store, within a plurality of records, sensor data (e.g., one or more frames of image data) in association with identifiers of locations and timestamps at which the sensor data was acquired.

Continuing with the example of FIG. 5, the AI service 508 is configured to process sensor data (e.g., images and/or sequences of images) to identify movement, human faces, and other features within the sensor data. The event listening service 510 is configured to scan location data transported via the ingress messages 5166 for events and, where an event is identified, execute one or more event handlers to process the event. In some examples, the event handlers can include an event reporter that is configured to identify reportable events and to communicate messages specifying the reportable events to one or more recipient processes (e.g., a customer interface 132 and/or a monitor interface 130). In some examples, the event listening service 510 can interoperate with the AI service 508 to identify events within sensor data. The identity provider 512 is configured to receive, via the transport services 126, authentication requests from the surveillance clients 136 or the camera agents 138 that include security credentials. When the identity provider 512 can authenticate the security credentials in a request (e.g., via a validation function, cross-reference look-up, or some other authentication process), the identity provider 512 can communicate a security token in response to the request. A surveillance client 136 or a camera agent 138 can receive, store, and include the security token in subsequent ingress messages 5166, so that the transport service 126A is able to securely process (e.g., unpack/parse) the packages included in the ingress messages 5166 to extract the location data prior to passing the location data to the surveillance service 128.

Continuing with the example of FIG. 5, the transport services 126 are configured to receive the ingress messages 51613, verify the authenticity of the messages 5166, parse the messages 5166, and extract the location data encoded therein prior to passing the location data to the surveillance service 128 for processing. This location data can include any of the location data described above with reference to FIG. 1. Individual transport services 126 may be configured to process ingress messages 51613 generated by location-based monitoring equipment of a particular manufacturer and/or model. The surveillance clients 136 and the camera agents 138 are configured to generate and communicate, to the surveillance service 128 via the network 118, ingress messages 5166 that include packages of location data based on sensor information received at the locations 102.

Continuing with the example of FIG. 5, the computing devices 518 are configured to host the monitor interfaces 130. In some examples, individual monitor interfaces 130A-130M are configured to render GUIs including one or more image frames and/or other sensor data. In certain examples, the customer device 122 is configured to host the customer interface 132. In some examples, customer interface 132 is configured to render GUIs including one or more image frames and/or other sensor data. Additional features of the monitor interfaces 130 and the customer interface 132 are described further below with reference to FIG. 6.

Figure 6:
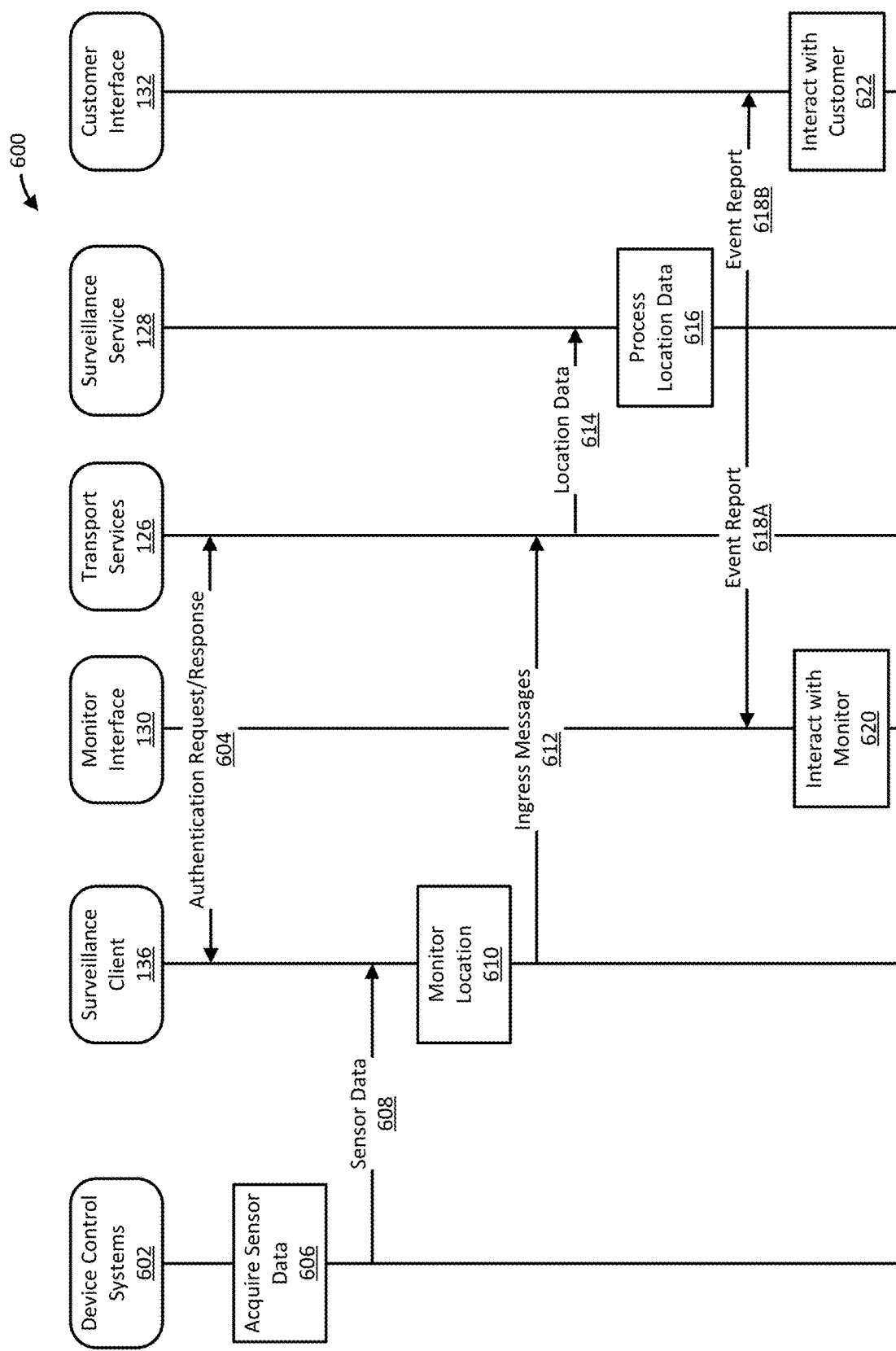
FIG. 6 is a sequence diagram of a monitoring process, according to some examples described herein.

Turning now to FIG. 6, a monitoring process 600 is illustrated as a sequence diagram. The process 600 can be executed, in some examples, by a security system (e.g., the security system 100 of FIG. 1). More specifically, in some examples, at least a portion of the process 600 is executed by the location-based devices under the control of device control system (DCS) code (e.g., either the code 308 or 408) implemented by at least one processor (e.g., either of the processors 300 or 400 of FIG. 3 or 4). The DCS code can include, for example, a camera agent (e.g., the camera agent 138 of FIG. 1). At least a portion of the process 600 is executed by a base station (e.g., the base station 114 of FIG. 1) under control of a surveillance client (e.g., the surveillance client 136 of FIG. 1). At least a portion of the process 600 is executed by a monitoring center environment (e.g., the monitoring center environment 120 of FIG. 1) under control of a monitor interface (e.g., the monitor interface 130 of FIG. 1). At least a portion of the process 600 is executed by a data center environment (e.g., the data center environment 124 of FIG. 1) under control of a surveillance service (e.g., the surveillance service 128 of FIG. 1) or under control of transport services (e.g., the transport services 126 of FIG. 1). At least a portion of the process 600 is executed by a customer device (e.g., the customer device 122 of FIG. 1) under control of a customer interface (e.g., customer interface 132 of FIG. 1).

As shown in FIG. 6, the process 600 starts with the surveillance client 136 authenticating with an identity provider (e.g., the identity provider 512 of FIG. 5) by exchanging one or more authentication requests and responses 604 with the transport service 126. More specifically, in some examples, the surveillance client 136 communicates an authentication request to the transport service 126 via one or more API calls to the transport service 126. In these examples, the transport service 126 parses the authentication request to extract security credentials therefrom and passes the security credentials to the identity provider for authentication. In some examples, if the identity provider authenticates the security credentials, the transport service 126 generates a security token and communicates the security token as a payload within an authentication response to the authentication request. In these examples, if the identity provider is unable to authenticate the security credentials, the transport service 126 generates an error code and communicates the error code as the payload within the authentication response to the authentication request. Upon receipt of the authentication response, the surveillance client 136 parses the authentication response to extract the payload. If the payload includes the error code, the surveillance client 136 can retry authentication and/or interoperate with a user interface of its host device (e.g., the user interface 212 of the base station 114 of FIG. 2) to render output indicating the authentication failure. If the payload includes the security token, the surveillance client 136 stores the security token for subsequent use in communication of location data via ingress messages. It should be noted that the security token can have a limited lifespan (e.g., 1 hour, 1 day, 1 week, 1 month, etc.) after which the surveillance client 136 may be required to reauthenticate with the transport service 126.

Continuing with the process 600, one or more DCSs 602 hosted by one or more location-based devices acquire 606 sensor data descriptive of a location (e.g., the location 102A of FIG. 1). The sensor data acquired can be any of a variety of types, as discussed above with reference to FIGS. 1-4. In some examples, one or more of the DCSs 602 acquire sensor data continuously. In some examples, one or more of the DCSs 602 acquire sensor data in response to an event, such as expiration of a timer (a push event) or receipt of an acquisition polling signal communicated by the surveillance client 136 (a poll event). In certain examples, one or more of the DCSs 602 stream sensor data to the surveillance client 136 with minimal processing beyond acquisition and digitization. In these examples, the sensor data may constitute a sequence of vectors with individual vector members including a sensor reading and a timestamp. Alternatively or additionally, in some examples, one or more of the DCSs 602 execute additional processing of sensor data, such as generation of one or more summaries of multiple sensor readings. Further still, in some examples, one or more of the DCSs 602 execute sophisticated processing of sensor data. For instance, if the security sensor includes an image capture device, the security sensor may execute image processing routines such as edge detection, motion detection, facial recognition, threat assessment, and reportable event generation.

Continuing with the process 600, the DCSs 602 communicate the sensor data 608 to the surveillance client 136. As with sensor data acquisition, the DCSs 602 can communicate the sensor data 608 continuously or in response to an event, such as a push event (originating with the DCSs 602) or a poll event (originating with the surveillance client 136).

Continuing with the process 600, the surveillance client 136 monitors 610 the location by processing the received sensor data 608. For instance, in some examples, the surveillance client 136 executes one or more image processing routines. These image processing routines may include any of the image processing routines described above with reference to the operation 606. By distributing at least some of the image processing routines between the DCSs 602 and surveillance clients 136, some examples decrease power consumed by battery-powered devices by off-loading processing to line-powered devices. Moreover, in some examples, the surveillance client 136 may execute an ensemble threat detection process that utilizes sensor data 608 from multiple, distinct DCSs 602 as input. For instance, in at least one example, the surveillance client 136 will attempt to corroborate an open state received from a contact sensor with motion and facial recognition processing of an image of a scene including a window to which the contact sensor is affixed. If two or more of the three processes indicate the presence of an intruder, the threat score is increased and or a break-in event is declared, locally recorded, and communicated. Other processing that the surveillance client 136 may execute includes outputting local alerts (e.g., in response to detection of particular events and/or satisfaction of other criteria) and detection of maintenance conditions for location-based devices, such as a need to change or recharge low batteries and/or replace/maintain the devices that host the DCSs 602. Any of the processes described above within the operation 610 may result in the creation of location data that specifies the results of the processes.

Continuing with the process 600, the surveillance client 136 communicates the location data 614 to the surveillance service 128 via one or more ingress messages 612 to the transport services 126. As with sensor data 608 communication, the surveillance client 136 can communicate the location data 614 continuously or in response to an event, such as a push event (originating with the surveillance client 136) or a poll event (originating with the surveillance service 128).

Continuing with the process 600, the surveillance service 128 processes 616 received location data. For instance, in some examples, the surveillance service 128 executes one or more routines described above with reference to the operations 606 and/or 610. Additionally or alternatively, in some examples, the surveillance service 128 calculates a threat score or further refines an existing threat score using historical information associated with the location identified in the location data and/or other locations geographically proximal to the location (e.g., within the same zone improvement plan (ZIP) code). For instance, in some examples, if multiple break-ins have been recorded for the location and/or other locations within the same ZIP code, the surveillance service 128 may increase a threat score calculated by a DCS 602 and/or the surveillance client 136. In some examples, the surveillance service 128 determines by applying a set of rules and criteria to the location data 614 whether the location data 614 includes any reportable events and, if so, communicates an event report 618A and/or 618B to the monitor interface 130 and/or the customer interface 132. A reportable event may be an event of a certain type (e.g., break-in) or an event of a certain type that satisfies additional criteria (e.g., movement within a particular zone combined with a threat score that exceeds a threshold value). The event reports 618A and/or 61813 may have a priority based on the same criteria used to determine whether the event reported therein is reportable or may have a priority based on a different set of criteria or rules.

Continuing with the process 600, the monitor interface 130 interacts 620 with monitoring personnel through, for example, one or more GUIs. These GUIs may provide details and context regarding one or more reportable events.

Continuing with the process 600, the customer interface 132 interacts 622 with at least one customer through, for example, one or more GUIs. These GUIs may provide details and context regarding one or more reportable events.

It should be noted that the processing of sensor data and/or location data, as described above with reference to the operations 606, 610, and 616, may be executed by processors disposed within various parts of the system 100. For instance, in some examples, the DCSs 602 execute minimal processing of the sensor data (e.g., acquisition and streaming only) and the remainder of the processing described above is executed by the surveillance client 136 and/or the surveillance service 128. This approach may be helpful to prolong battery runtime of location-based devices. In other examples, the DCSs 602 execute as much of the sensor data processing as possible, leaving the surveillance client 136 and the surveillance service 128 to execute only processes that require sensor data that spans location-based devices and/or locations. This approach may be helpful to increase scalability of the system 100 with regard to adding new locations.

Figure 7:
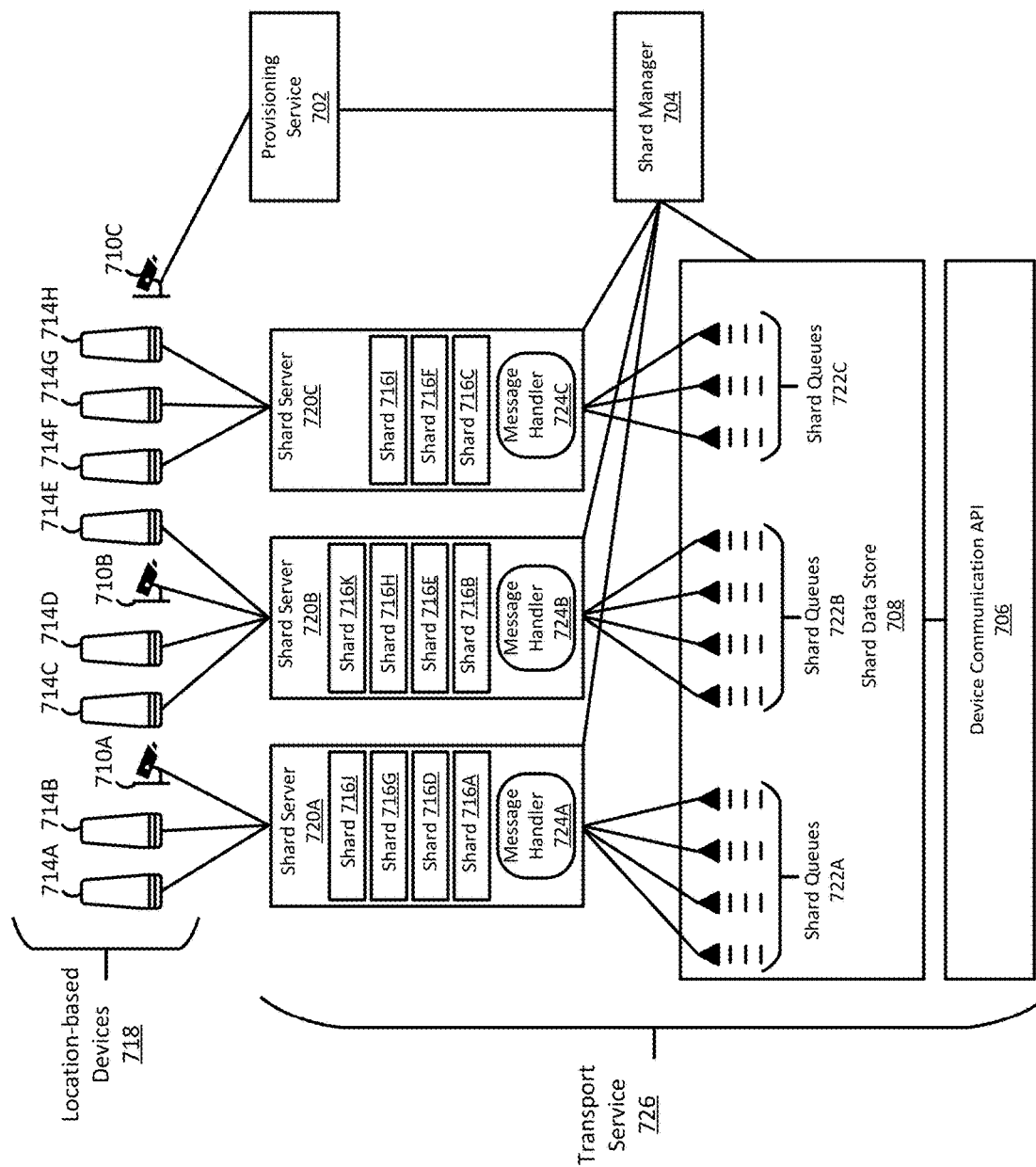
FIG. 7 is a schematic diagram of processes, data structures, and data stores that implement a transport service, according to some examples described herein.

Turning now to FIG. 7, a transport service 726 is illustrated in a schematic diagram. The transport service 726 is one example of the transport services 126 described above with reference to FIGS. 1, 5, and 6. As shown in FIG. 7, the transport service 726 includes shard servers 720A-720C (collectively the shard servers 720), a shard data store 708, a device communication API 706, a provisioning service 702, and a shard manager 704. The shard servers 720 host shards 716A-716K (collectively the shards 716) and message handlers 724A-724C (collectively the message handlers 724). The shard data store 708 houses the shard queues 722A-722C (collectively the shard queues 722).

The transport service 726 illustrated in FIG. 7 utilizes shards to balance message handling load at a device connection level within the communication stack of a security system (e.g., the security system 100 of FIG. 1). In certain examples, a shard is an associative mechanism that bundles multiple connections with location-based devices 718 into a cohort or set that can be managed by the shard manager 704 and serviced by the shard servers 720 as a single, cohesive unit. The connections bundled together in a shard may be bi-directional connections. In some examples, a shard is a data structure with fields configured to store an identifier of the shard (e.g., a URL), identifiers of connections with the location-based devices 718 (e.g., TCP socket identifiers) that belong to the shard, and one or more identifiers of one or more of the shard queues 722 (e.g., references to queue data structures) associated with the shard. The shard queues 722 associated with the shard are sized based on the number of connections in the shard and hold messages to be processed during servicing of the shard. The shard data structure can be stored in the shard data store 708 in some examples. Shards can be created, destroyed, or moved between the shard servers 720 by the shard manager 704. A shard hosted by a shard server can be serviced thereby through execution of a message handler to process ingress messages (e.g., the ingress messages 51613 of FIG. 5) and egress messages (e.g., the egress messages 516A of FIG. 5) with routing that involves a connection within the shard. It should be noted that, in some examples, a shard server can access shard queues associated with shards hosted by the shard server. Also, in some examples, a shard server cannot access shard queues associated with shards hosted by other shard servers.

As shown in FIG. 7, the transport service 726 is configured to connect to and interoperate with a host of location-based devices 718. The location-based devices 718 include base stations 714A-714H (collectively the base stations 714) and image capture devices 710A-710C (collectively the image capture devices 710). Examples of the base stations 714 include the base station 114 of FIG. 1. Examples of the image capture devices 710 include the image capture device 110 of FIG. 1. The location-based devices 718 are configured to interoperate with the transport service 726 via the shard servers 720. For instance, the location-based devices 714A, 714B, and 710A are configured to interoperate with the transport service 726 via the shard server 720A. The location-based devices 714C, 714D, 714E, and 710B are configured to interoperate with the transport service 726 via the shard server 720B. The location-based devices 714F, 714G, and 714H are configured to interoperate with the transport service 726 via the shard server 720C. These interoperations may be accomplished, for example, using an HTTP request, response API exposed and implemented by the shard servers 720 and utilized by the location-based devices 718.

As will be described further below, in some examples, the location-based devices 718 are assigned to particular shards during a provisioning process executed by the provisioning service 702. In these examples, assignment of a device (e.g., one of the location-based devices 718) to a shard (e.g., one of the shards 716) is effected by storing a URL that identifies the shard within non-volatile memory of the device. In these examples, the device can interoperate with a shard server that hosts the shard by transmitting one or more HTTP API calls to the URL that identifies the shard. Domain name system (DNS) servers can direct the HTTP API calls to the shard server associated with the URL. In some examples, the one or more HTTP API calls can establish a connection (e.g., a TCP socket, web socket, webRTC connection, etc.) between processes (e.g., the surveillance client 136 of FIG. 1, the camera agent 138 of FIG. 1, etc.) hosted on the device and message handling processes (e.g., one of the message handlers 724) hosted on the shard server. Through this connection, the device can exchange ingress and egress messages with the server. For instance, a process hosted by the device can exchange ingress and egress messages with a process hosted by the server. Further examples of operations that the location-based devices 718 are configured to execute in some examples are described further below with reference to FIGS. 8 and 9.

Continuing with the example of FIG. 7, the shard servers 720 incorporate a web server or are otherwise configured to process HTTP traffic directed to the shard servers 720 by DNS servers. This HTTP traffic can include, for example, the HTTP API calls generated by the location-based devices 718, as described above. In certain examples, a shard server (e.g., one of the shard servers 720) is configured to respond to these HTTP API calls by establishing a connection between a message handler (e.g., one of the message handlers 724) hosted by the shard server and a process hosted on a device (e.g., one of the location-based devices 718). This connection belongs to a shard (e.g., one of the shards 716). The message handler is configured to receive ingress messages from the processes hosted on the device and enqueue these ingress messages on a shard queue (e.g., one of the shard queues 722) associated with the shard. The message handler is also configured to dequeue egress messages addressed to the device from the shard queue and transmit the egress messages to the device. In certain examples, the message handler is configured to dequeue messages in batches. In some examples, the message handler is further configured to repeat attempts to transmit the egress messages to the device where an initial attempt fails until the egress messages are delivered or a time-to-live value of the egress messages expires. In some examples, prior to repeating transmission attempts, the message handler may move undelivered messages to a specific reconnection queue. It should be noted that the message handler hosted by a shard server (and thus the shard server itself) can only access messages involving a connection that is a member of a shard hosted by the shard server. This feature provides a mechanism through which message handling load can be controlled, as is described further below. Further examples of operations that the shard servers 720 are configured to execute in some examples are described further below with reference to FIGS. 8-10.

As shown in FIG. 7, the shard server 720A hosts and services shards 716A, 716D, 716G, and 716J. The shard server 720B hosts and services shards 716B, 716E, 716H, and 716K. The shard server 720C hosts and services shards 716C, 716F, and 716I. Each connection between the location-based devices 714A, 714B, and 710A and the shard server 720A is a member of one of the shards 716A, 716D, 716G, and 716J. Individual connections between the location-based devices 714C, 714D, 714E, and 710B and the shard server 720B is a member of one of the shards 716B, 716E, 716H, and 716K. Individual connections between the location-based devices 714F, 714G, and 714H and the shard server 720C is a member of one of the shards 716C, 716F, and 716I. The shard queues 722A store messages with routing that involves a connection within one of the shards 716A, 716D, 716G, and 716J. The shard queues 722B store messages with routing that involves a connection within one of the shards 716B, 716E, 716H, and 716K. The shard queues 722C store messages with routing that involves a connection within one of the shards 716C, 716F, and 716I.

For instance, in one example, the base station 714A is connected to the shard server 720A via a TCP socket that belongs to the shard 716J. Further, in this example, the shard 716J is associated with one of the shard queues 722A. This shard queue stores egress messages addressed to a process hosted on the base station 714A. When servicing the shard 716J, the message handler 724A dequeues the egress messages addressed to the process hosted by the base station 714A and stored in the shard queue associated with the shard 716J and transmits the egress messages to the base station 714A via the TCP socket. In this example, the message handler also receives ingress messages via the TCP socket and enqueues the ingress messages into the shard queue associated with the shard 716J. It should be noted that, in some implementations, references to messages (rather than copies of the messages themselves) are stored in the shard queues 722 to efficiently utilize storage space allocated to the shard queues 722.

Continuing with the example of FIG. 7, the device API 706 is configured to expose and implement an API through which remote processes hosted by devices of the security system other than the location-based devices can interoperate with processes hosted by the location-based devices. Examples of remote processes that can utilize the device API 706 to communicate with processes hosted by the location-based devices include the surveillance service 128, the monitoring interfaces 130, and the customer interfaces 132 of FIG. 1. For instance, in one example, a remote process can send a message to a recipient process hosted by a location-based device by transmitting an API call to the device API 706. The device API 706 can receive the API call and process the API call to generate the message, identify a shard queue (e.g., one of the shard queues 722) associated with a shard having a connection with the recipient process, and enqueue the message with the identified shard queue. In this way, the device API 706 deposits the message within a shard queue for subsequent processing by a message handler (e.g., one of the message handlers 724) that can communicate with the recipient process. Further examples of operations that the device API 706 is configured to execute in some examples are described further below with reference to FIG. 8.

Continuing with the example of FIG. 7, the provisioning service 702 is configured to process connection requests from processes hosted by the location-based devices 718. For instance, in one example, a process (e.g., a camera agent 138 of FIG. 1) hosted by the device 710C transmits a connection request via an API call to the provisioning service 702. The provisioning service 726 receives the API call and parses the API call to extract the connection request therefrom. Next, the provisioning service 702 interoperates with the shard manager 704 to identify a shard (e.g., one of the shards 716) hosted by a shard server (e.g., one of the shard servers 720C) with sufficient capacity to service a connection with the process hosted by the device 710C. Upon receipt of an identifier of such a shard (e.g., a URL identifying the shard 716I), the provisioning service 702 communicates the identifier to the process hosted by the device 710C via a response to the process's API call. The process hosted by the device 710C can utilize the identifier of the shard to establish a connection with the host of the identified shard (e.g., the shard server 720C). Further examples of operations that the provisioning service 702 is configured to execute in some examples are described further below with reference to FIGS. 8 and 9.

Continuing with the example of FIG. 7, the shard manager 704 is configured to interoperate with the provisioning service 702 to assign device connections to shards and to interoperate with the shard servers 720 to balance message processing load. For instance, in one example, the shard manager 704 receives a request to assign a connection with a process hosted on the device 710C to a shard (e.g., one of the shards 716 or a new shard). In this example, the shard manager 704 identifies an existing shard (e.g., one of the shards 716) hosted by a shard server (e.g., one of the shard servers 720C) with sufficient capacity to service the shard. Alternatively, where no such existing shard can be identified, the shard manager 704 creates a new shard and/or a new shard server with sufficient capacity to service the connection. Regardless of whether an existing shard is identified or a new shard is created, the shard manager 704 responds to the request with an identifier of the extant or new shard. Additionally or alternatively, in an example, the shard manager 704 detects an event that indicates execution of a load balancing process is warranted. Examples of such an event include expiration of a timer, receipt of a balancing request, failure of a shard server, and/or one or more system performance priorities not being met. In this example, in response to detection of the event, the shard manager interoperates with the shard servers 720 to determine whether movement of one or more shards is needed to adhere to the system performance priorities and, if so, moves the one or more shards as needed to better balance the message processing load and adhere to the system performance priorities. Further examples of operations that the shard manager 704 is configured to execute in some examples are described further below with reference to FIGS. 8-10.

It should be noted that, in the transport service 726 illustrated in FIG. 7, the shard servers 720 can be implemented using physical or virtual servers within a data center environment (e.g., the data center environment 124 of FIG. 1). Further, in some examples, the shard data store 708 can be implemented using any of a variety database or queuing technologies, such as relational databases (e.g. ORACLE, SQL SERVER, etc.), non-relational databases (e.g., MONGODB, DYNAMODB, REDIS, etc.) or queue systems (e.g., KAFKA, etc.). Additionally, in some examples, the transport service 726 is configured to monitor the health of the shard servers 720, the shard data store 708, the device API 706, the provisioning service 702, and the shard manager 704, and the publish events regarding these processes to the shard manager 704 and/or a back-up shard manager. In these examples, the transport service 726 can utilize leader election via optimistic locking to enable failover to the back-up shard manager, should the shard manager 704 fail.

Figure 8:
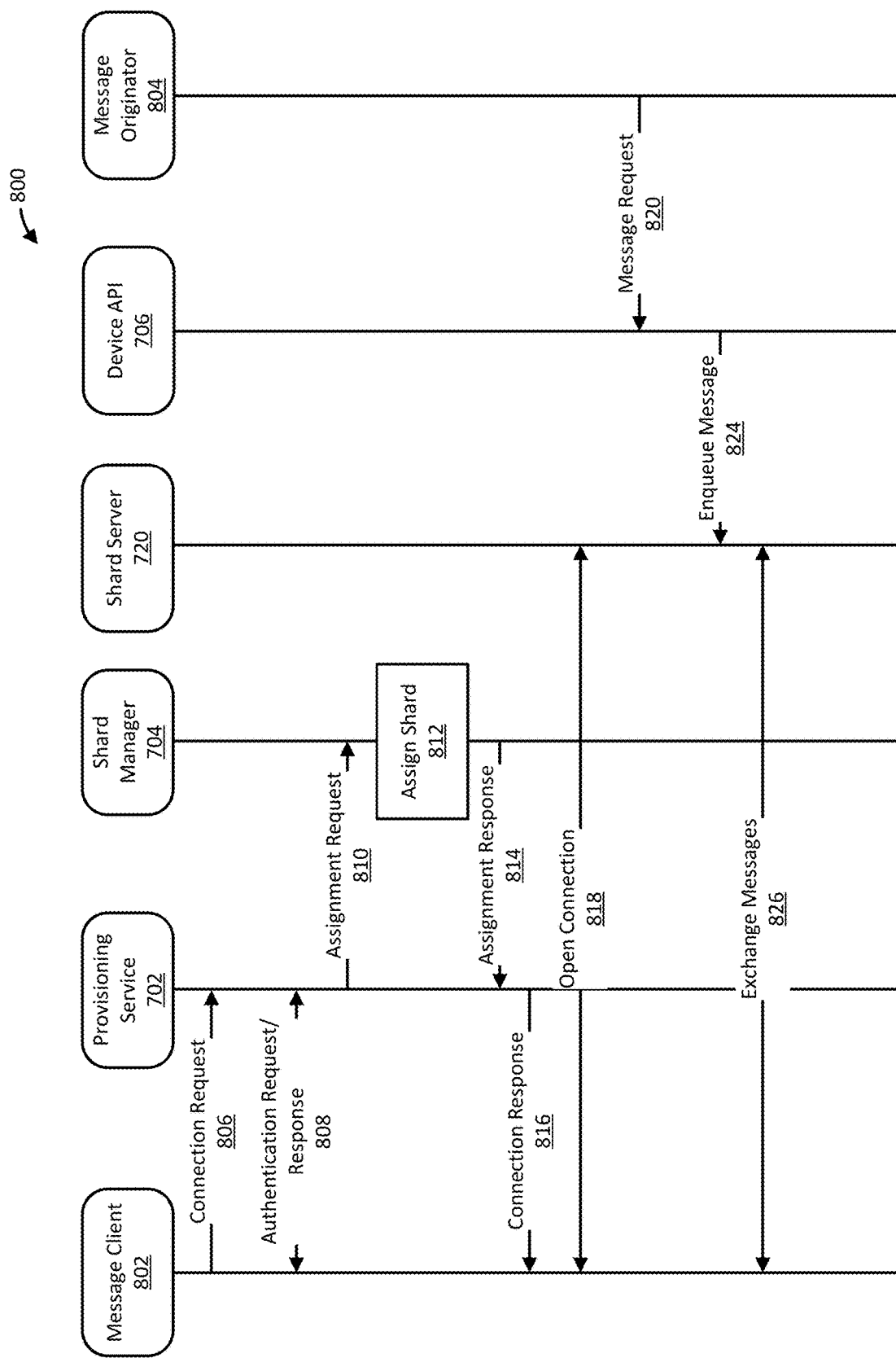
FIG. 8 is a sequence diagram of a device connection and communication process, according to some examples described herein.

Turning now to FIG. 8, a device connection and communication process 800 is illustrated as a sequence diagram. The process 800 can be executed, in some examples, by a security system (e.g., the security system 100 of FIG. 1). More specifically, in some examples, at least a portion of the process 800 is executed by one or more location-based devices (e.g., the devices 104-112 of FIG. 1) under the control of device control system (DCS) code (e.g., either the code 308 or 408) implemented by at least one processor (e.g., either of the processors 300 or 400 of FIG. 3 or 4). At least a portion of the process 800 is executed by a base station (e.g., the base station 114 of FIG. 1) under control of a surveillance client (e.g., the surveillance client 136 of FIG. 1). At least a portion of the process 800 is executed by a data center environment (e.g., the data center environment 124 of FIG. 1) under control of a transport service (e.g., the transport service 726 of FIG. 7). At least a portion of the process 800 is executed by the data center environment under control of a surveillance service (e.g., the surveillance service 128 of FIG. 1); a monitoring center environment (e.g., the monitoring center environment 120 of FIG. 1) under control of a monitor interface (e.g., the monitor interface 130 of FIG. 1); or a customer device (e.g., the customer device 122 of FIG. 1) under control of a customer interface (e.g., customer interface 132 of FIG. 1).

As shown in FIG. 8, the process 800 starts with a message client 802 hosted by a location-based device (e.g., the surveillance client 136 of FIG. 1, the camera agent 138 of FIG. 1, or the DCS 602 of FIG. 6) communicating a connection request 806 to a provisioning service 702. For instance, in some examples, the message client 802 transmits an HTTP API call specifying the connection request 806 to an API endpoint monitored under control of the provisioning service 702, although other communication protocols (e.g., MQTT) may be used. The connection request 806 can include, for example, data specifying an identifier of the message client 802 and/or the location-based device.

Continuing with the process 800, the provisioning service 702 authenticates (e.g., via an identity provider, such as the identity provider 512 of FIG. 5) the message client 802 by exchanging one or more authentication requests and responses 808 with the message client 802. More specifically, in some examples, the message client 802 communicates an authentication request to the provisioning service 702 via one or more API calls to the provisioning service 702. In these examples, the provisioning service 702 parses the authentication request to extract security credentials therefrom and passes the security credentials to the identity provider for authentication. In some examples, if the identity provider authenticates the security credentials, the provisioning service 702 generates a security token and communicates the security token as a payload within an authentication response to the authentication request. In these examples, if the identity provider is unable to authenticate the security credentials, the provisioning service 702 generates an error code and communicates the error code as the payload within the authentication response to the authentication request. Upon receipt of the authentication response, the message client 802 parses the authentication response to extract the payload. If the payload includes the error code, the message client 802 can retry authentication and/or interoperate with a user interface of its host device to render output indicating the authentication failure. If the payload includes the security token, the message client 802 stores the security token for subsequent use in communication of ingress messages. It should be noted that the security token can have a limited lifespan (e.g., 1 hour, 1 day, 1 week, 1 month, etc.) after which the message client 802 may be required to reauthenticate with the provisioning service 702.

Continuing with the process 800, if the provisioning service 702 successfully authenticates the message client 802, the provisioning service 702 communicates, to a shard manager 704, a request 810 to assign a new connection with the message client 802 to a shard. For instance, in some examples, the provisioning service 702 transmits an API call to the shard manager 704 that specifies an identifier of the message client 802 and/or the location-based device.

Figure 9:
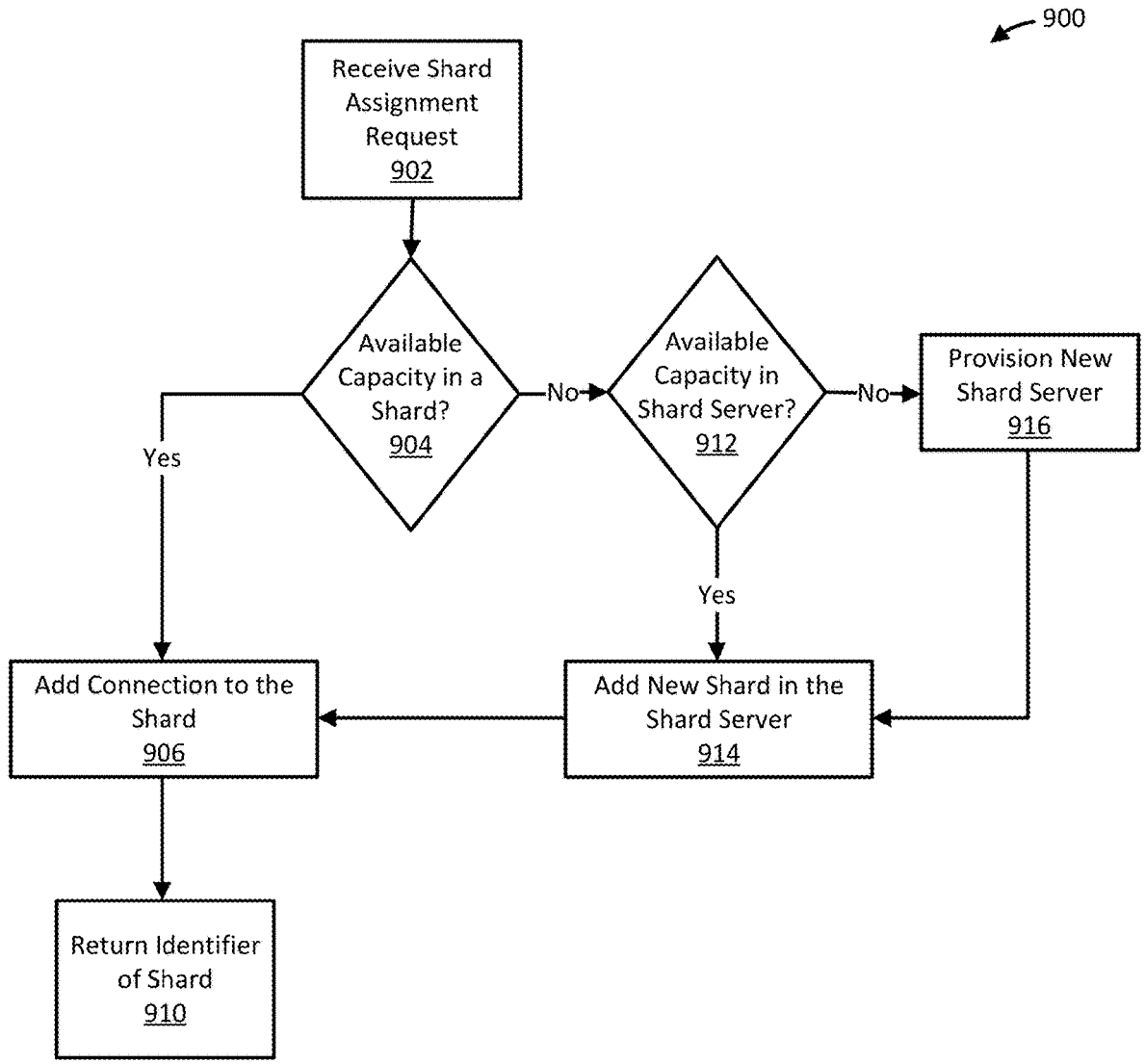
FIG. 9 is a flow diagram of an assignment process, according to some examples described herein.

Continuing with the process 800, the shard manager 704 assigns 812 the new connection with the message client 802 to a shard. FIG. 9 is a flow diagram illustrating an assignment process 900 executed under control of the shard manager 704 in some examples of the operation 812. As shown in FIG. 9, the process 900 starts with a shard manager (e.g., the shard manager 704 of FIGS. 7 and 8) receiving 902 a shard assignment request (e.g., the request 810 of FIG. 8).

Continuing with the process 900, the shard manager parses the shard assignment request to extract an identifier of a message client (e.g., the message client of FIG. 8) and/or a location-based device that hosts the message client and determines 904 whether one of the existing shards (e.g., one of the shards 716 of FIG. 7) has sufficient capacity to add a new connection with the message client. For instance, in some examples, the shard manager respectively compares attributes of the existing shards to values (e.g., predetermined threshold values) to determine whether the attributes of an existing shard transgress the threshold values. If the attributes of an existing shard do not transgress the threshold values, the shard manager determines that one or more system performance priorities can be maintained if the new connection is added to the existing shard and, thus, determines that the existing shard has sufficient capacity to add the new connection. Examples of shard attributes that may be examined in operation 904 include a number of connections within a shard and an amount of data being communicated through the connections. If the shard manager determines that an existing shard has sufficient available capacity to add the new connection, the shard manager designates the existing shard as a target shard and proceeds to operation 906. If the shard manager determines that no existing shard has sufficient available capacity to add the new connection, the shard manager proceeds to operation 912.

Continuing with the process 900, the shard manager determines 912 whether one of the existing shards servers (e.g., one of the shards servers 720 of FIG. 7) has sufficient capacity to add a new shard. For instance, in some examples, the shard manager 704 interoperates with the existing shard servers to calculate one or more metrics indicative of available server capacity at individual existing shard servers. For instance, the shard manager 704 may calculate the one or more metrics for individual existing shard servers. Next, the shard manager respectively compares the metrics of the existing shard servers to values (e.g., predetermined threshold values) to determine whether the metrics of an existing shard server transgress the threshold values. If the metrics of an existing shard server do not transgress the threshold values, the shard manager determines that one or more system performance priorities can be maintained if the new shard is added to the existing shard server and, thus, determines that the existing shard server has sufficient capacity to add the new shard. Examples of metrics that may be calculated and analyzed in the operation 912 include available memory, CPU utilization, and network responsiveness of the existing shard servers to name a few metrics. If the shard manager determines that an existing shard server has sufficient capacity to add the new shard, the shard manager designates the existing shard server as a target shard server and proceeds to operation 914. If the shard manager determines that no existing shard server has sufficient capacity to add the new shard, the shard manager proceeds to operation 916.

Continuing with the process 900, the shard manager provisions 916 a new shard server. For instance, in some examples, the shard manager interoperates with a cloud computing service hosted by a data center environment (e.g., the data center environment 124 of FIG. 1) to launch a new virtual machine and configure the new virtual machine as a shard server. Next, the shard manager designates the new shard server as a target shard server and proceeds to the operation 914.

Continuing with the process 900, the shard manager adds 914 the new shard in the target shard server. For instance, in some examples, to add the new shard the shard manager interoperates with the target shard server to setup a new endpoint URL that identifies the new shard and that is monitored by the web server of the target shard server for HTTP requests to open device connections to the shard server. Also, in some examples, to add the new shard the shard manager interoperates with a shard data store (e.g., the shard data store 708 of FIG. 7) to allocate a new shard queue and new shard data structure for the new shard. The new shard data structure may store the new endpoint URL and an identifier of the new shard queue. The shard manager next designates the new shard as a target shard and proceeds to the operation 906.

Continuing with the process 900, the shard manager adds 906 the new connection to the target shard. For instance, in some examples, the shard manager allocates a new field with a default value (e.g., the identifier of the message client and/or the location-based device) within a data structure of the target shard (e.g., the shard data structure stored in the shard data store 708 described above with reference to FIG. 7). This new field is allocated to store an identifier of the new connection within the shard data structure once the new connection is established.

Continuing with the process 900, the shard manager responds 910 to the shard assignment request received in the operation 902 with an identifier of the target shard. For instance, in some examples, the shard manager responds to the API call received in the operation 902 with a URL that identifies the target shard. Subsequent to the operation 910, the process 900 terminates.

Returning to the process 800, the shard manager communicates, to the provisioning service 702, a response 814 to the request 810 to assign a new connection. For instance, in some examples, the shard manager transmits a response 814 to the request 810 that specifies a URL that identifies the shard assigned to the new connection.

Continuing with the process 800, the provisioning service 702 processes the assignment response 814 to generate and communicate a response 816 to the connection request 806. For instance, in some examples, the provisioning service 702 receives the assignment response 814, parses the assignment response 814 to extract the URL that identifies the shard assigned to the new connection, and writes data to the connection response 816 that specifies the URL prior to transmitting the connection response 816 to the message client 802.

Continuing with the process 800, the message client 802 interoperates with the shard server 720 to open a connection 818 (e.g., a TCP socket) between the message client 802 and the shard server 720. For instance, in some examples, the message client 802 receives the connection response 816, parses the connection response 816 to extract the URL that identifies the shard hosted by the shard server 720, and transmits an HTTP API call to the URL to request a bi-directional, long-lived connection with the shard server 720. The shard server 720 receives the request and interoperates with the message client to open the connection 818 between the message client 802 and the shard server 720. In some examples, as a part of opening the connection 818, the shard server stores an association between the shard and an identifier of the connection within the shard data structure. In some examples, this connection identifier is a 4 tuple specifying an IP address of the device hosting the message client 802, a port number identifying the message client, an IP address of the shard server 720, and a port number identifying a message handling process (e.g., one of the message handlers 724 of FIG. 7) hosted by the shard server 720.

Continuing with the process 800, a message originator 804 hosted by a device of the security system other than a location-based device (e.g., the monitor interfaces 130, the surveillance service 128, or the customer interfaces 132 of FIG. 1) communicates a request 820 to send a message to a process hosted by a location-based device (e.g., the message client 802). For instance, in some examples, the message originator 804 transmits an HTTP API call specifying the message request 820 to an API endpoint monitored under control of the device API 706, although other communication protocols (e.g., MQTT) may be used. The message request 820 can include, for example, data specifying the message and an identifier of the message client 802 and/or the location-based device.

Continuing with the process 800, the device API 706 processes the message request 820 to generate and communicate, to the shard server 720, a request to enqueue the message for delivery to the message client 802. For instance, in some examples, the device API 706 receives the message request 820, parses the request to extract the message and an identifier of the recipient process (e.g., the message client 802), identifies the queue of a shard including a connection with the recipient process, and enqueues the message 824 with the identified shard queue. In some examples, the device API 706 identifies the shard queue by locating an identifier of the recipient process within a shard data structure stored in the shard data store.

Continuing the process 800, the shard server 720 and the message client 802 exchange ingress and egress messages 826. For instance, in some examples, the message handling process of the shard server 720 dequeues the message sent by the message originator 804 from the shard queue and transmits the message to the message client via the connection as an egress message. In certain examples, the message client responds to the egress message by transmitting an ingress message to the message handling process. In these examples, the message handling process enqueues the ingress message with the shard queue for subsequent processing by the device API 706 and/or the message originator 804.

Figure 10:
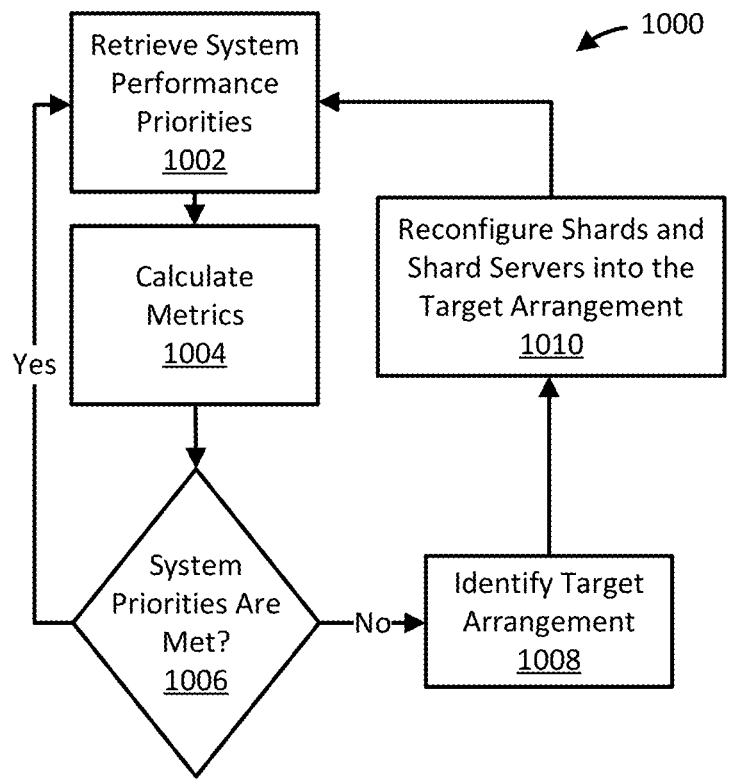
FIG. 10 is a flow diagram of a load balancing process, according to some examples described herein.

Turning now to FIG. 10, a load balancing process 1000 is illustrated as a flow diagram. The process 1000 can be executed, in some examples, by a security system (e.g., the security system 100 of FIG. 1). More specifically, in some examples, the process 1000 is executed by a data center environment (e.g., the data center environment 124 of FIG. 1) under control of a transport service (e.g., the transport service 726 of FIG. 7).

As illustrated in FIG. 10, the process 1000 starts with the transport service retrieving 1002 data specifying system performance priorities. For instance, in some examples, the transport service retrieves one or more rules that can be evaluated using values of one or more variables to determine whether the system performance priorities are met. In these examples, when the one or more rules evaluate to true, the system performance priorities are met and when any one of the rules evaluates to false, the system priorities are not met. In some examples, the one or more rules compare one or more values of the one or more variables to one or more corresponding values (e.g., thresholds). In these examples, the one or more rules evaluate to true when the one or more values do not transgress the one or more thresholds, and the one or more rules evaluate to false when at least one value of at least one variable transgresses at least one threshold that corresponds to the at least one value. In some examples, the one or more variables store values of one or more metrics indicative of system performance. In these examples, the one or more metrics indicative of system performance may include connection responsiveness and throughput, among others.

Continuing with the process 1000, the shard manager calculates 1004 metrics indicative of system performance. For instance, in some examples, the shard manager communicates, via the shard queues, data to one or more processes hosted by location-based devices and/or to one or more processes hosted by devices in the security system other than location-based devices to calculate the metrics indicative of system performance. In certain examples, the data communicated by the shard manager may include test data that the shard manager traces as the test data is processed by the system.

Continuing with the process 1000, the shard manager determines 1006 whether the system performance priorities are met. For instance, in some examples, the shard manager evaluates the one or more rules retrieved in the operation 1002 using the one or more metrics calculated in the operation 1004. In these examples, the shard manager determines that the system performance priorities are met when the rules evaluate to true and determines that the system performance priorities are not met with one or more of the rules evaluate to false. When the shard manager determines that the system performance priorities are met, the shard manager returns to operation 1002 to refresh the one or more rules. When the shard manager determines that the system performance priorities are not met, the shard manager proceeds to operation 1008.

Continuing with the process 1000, the shard manager identifies 1008 a target arrangement of shards and shard servers to implement the system performance priorities. In certain examples, the target arrangement is a configuration of shard servers and shards that can support system performance priorities when servicing connections. For instance, in some examples, the shard manager iteratively simulates varying hypothetical arrangements of the existing shards (e.g., the shards 716 of FIG. 7) within the existing shard servers (e.g., the shard servers 720 of FIG. 7), calculates simulated metrics for varying hypothetical arrangements, evaluates the one or more rules using the simulated metrics, and identifies a hypothetical arrangement with simulated metrics that result in the one or more rules evaluating to true. If no such arrangement can be identified, the shard manager adds one or more hypothetical shard servers to the varying hypothetical arrangements and repeats the iterative analysis described above until a hypothetical arrangement with simulated metrics that result in the one or more rules evaluates to true. The shard manager designates, as the target arrangement, the hypothetical arrangement with simulated metrics that result in the one or more rules evaluating to true.

Continuing with the process 1000, the shard manager reconfigures 1010 the shard servers and the shards into the target arrangement. For instance, in some examples, the shard manager launches or terminates shard servers, adds or deletes shards, and/or moves shards between shard servers to implement the target configuration. Examples of specific operations required to implement the target configuration (e.g., adjustments to shards and shard servers) are discussed above with reference to FIG. 9. For instance, in some examples, the shard manager moves a shard from a first shard server to a second shard server by reconfiguring a web server within the second shard server to process requests to the URL of the shard and reconfiguring a web server within the first shard server to not process requests to the URL of the shard. In some examples, to move a shard, the shard manager may also interoperate with the first shard server to terminate connections with processes hosted by location-based devices and interoperate with the second shard server to re-establish those connections. Subsequent to the operation 1010, the process 1000 terminates.

Figure 11:
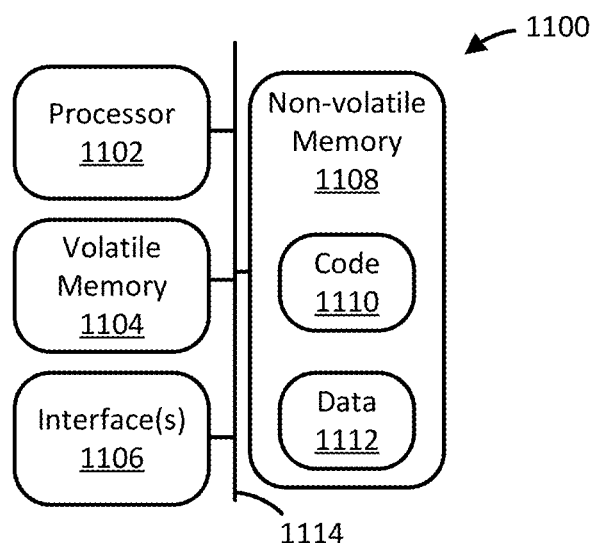
FIG. 11 is a schematic diagram of a computing device, according to some examples described herein.

Turning now to FIG. 11, a computing device 1100 is illustrated schematically. As shown in FIG. 11, the computing device includes at least one processor 1102, volatile memory 1104, one or more interfaces 1106, non-volatile memory 1108, and an interconnection mechanism 1114. The non-volatile memory 1108 includes code 1110 and at least one data store 1112.

In some examples, the non-volatile (non-transitory) memory 1108 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 1110 stored in the non-volatile memory can include an operating system and one or more applications or programs that are configured to execute under the operating system. Alternatively or additionally, the code 1110 can include specialized firmware and embedded software that is executable without dependence upon a commercially available operating system. Regardless, execution of the code 1110 can result in manipulated data that may be stored in the data store 1112 as one or more data structures. The data structures may have fields that are associated through colocation in the data structure. Such associations may likewise be achieved by allocating storage for the fields in locations within memory that convey an association between the fields. However, other mechanisms may be used to establish associations between information in fields of a data structure, including through the use of pointers, tags, or other mechanisms.

Continuing the example of FIG. 11, the processor 1102 can be one or more programmable processors to execute one or more executable instructions, such as a computer program specified by the code 1110, to control the operations of the computing device 1100. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 1104) and executed by the circuitry. In some examples, the processor 1102 is a digital processor, but the processor 1102 can be analog, digital, or mixed. As such, the processor 1102 can execute the function, operation, or sequence of operations using digital values and/or using analog signals. In some examples, the processor 1102 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 1102 that are multicore can provide functionality for parallel, simultaneous execution of instructions or for parallel, simultaneous execution of one instruction on more than one piece of data.

Continuing with the example of FIG. 11, prior to execution of the code 1110 the processor 1102 can copy the code 1110 from the non-volatile memory 1108 to the volatile memory 1104. In some examples, the volatile memory 1104 includes one or more static or dynamic random access memory (RAM) chips and/or cache memory (e.g. memory disposed on a silicon die of the processor 1102). Volatile memory 1104 can offer a faster response time than a main memory, such as the non-volatile memory 1108.

Through execution of the code 1110, the processor 1102 can control operation of the interfaces 1106. The interfaces 1106 can include network interfaces. These network interfaces can include one or more physical interfaces (e.g., a radio, an ethernet port, a USB port, etc.) and a software stack including drivers and/or other code 1110 that is configured to communicate with the one or more physical interfaces to support one or more LAN, PAN, and/or WAN standard communication protocols. The communication protocols can include, for example, TCP and UDP among others. As such, the network interfaces enable the computing device 1100 to access and communicate with other computing devices via a computer network.

The interfaces 1106 can include user interfaces. For instance, in some examples, the user interfaces include user input and/or output devices (e.g., a keyboard, a mouse, a touchscreen, a display, a speaker, a camera, an accelerometer, a biometric scanner, an environmental sensor, etc.) and a software stack including drivers and/or other code 1110 that is configured to communicate with the user input and/or output devices. As such, the user interfaces enable the computing device 1100 to interact with users to receive input and/or render output. This rendered output can include, for instance, one or more GUIs including one or more controls configured to display output and/or receive input. The input can specify values to be stored in the data store 1112. The output can indicate values stored in the data store 1112.

Continuing with the example of FIG. 11, the various features of the computing device 1100 described above can communicate with one another via the interconnection mechanism 1114. In some examples, the interconnection mechanism 1114 includes a communications bus.

Various inventive concepts may be embodied as one or more methods, of which examples have been provided. The acts performed as part of a method may be ordered in any suitable way. Accordingly, examples may be constructed in which acts are performed in an order different than illustrated, which may include performing some acts simultaneously, even though shown as sequential acts in illustrative examples.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Having described several examples in detail, various modifications and improvements will readily occur to those skilled in the art. Such modifications and improvements are intended to be within the scope of this disclosure. Accordingly, the foregoing description is by way of example only, and is not intended as limiting.

The invention claimed is:

1. A method comprising:
   receiving, from a device, a request to establish a bi-directional connection between the device and a computing environment comprising a plurality of servers, individual servers of the plurality supporting at least one group of connections;
   determining that no group of connections within the computing environment has capacity to support the received bi-directional connection;
   adding a new group of connections to a server of the plurality of servers; and
   adding the received bi-directional connection to the new group of connections to enable receipt of data generated by at least one sensor disposed in a location being monitored by the device.

2. The method of claim 1, further comprising determining that the server of the plurality has capacity to support the new group of connections and the received bi-directional connection prior to adding the new group of connections.

3. The method of claim 2, wherein determining that the server of the plurality has capacity to support the new group of connections and the received bi-directional connection comprises:
   calculating one or more metrics indicative of performance of a system comprising the device and the computing environment; and
   evaluating one or more rules using the one or more metrics.

4. The method of claim 3, wherein calculating the one or more metrics comprises calculating one or more of available memory, central processing unit utilization, and network responsiveness.

5. The method of claim 1, further comprising:
   determining that no server of the plurality has capacity to support the received bi-directional connection; and
   provisioning the server of the plurality prior to adding the new group of connections.

6. The method of claim 5, wherein provisioning the server comprises launching a new virtual machine within the computing environment.

7. The method of claim 1, wherein adding the new group of connections comprises setting up a new uniform resource locator that identifies the new group of connections.

8. The method of claim 1, further comprising responding, to the device, with a uniform resource locator that identifies the new group of connections.

9. The method of claim 1, wherein determining that no group of connections within the computing environment has capacity to support the received bi-directional connection comprises comparing one or more of a number of connections within a group of connections or an amount of data being communicated through the group of connections to one or more threshold values.

10. A system of computing devices, the system comprising at least one computing device comprising:
    a memory; and
    at least one processor coupled with the memory and configured to:
       receive, from a device, a request to establish a bi-directional connection between the device and the system, some computing devices within the system supporting at least one group of connections;
       determine whether a group of connections within the system has capacity to support the requested bi-directional connection; and
       add the requested bi-directional connection to the group of connections in response to a determination that the group of connections has capacity to support the received bi-directional connection to enable receipt of data generated by at least one sensor disposed in a location being monitored by the device.

11. The system of claim 10, wherein the at least one processor is further configured to respond, to the device, with a uniform resource locator that identifies the group of connections.

12. The system of claim 10, wherein to determine whether the group of connections has capacity to support the received bi-directional connection comprises to compare one or more of a number of connections within the group of connections or an amount of data being communicated through the group of connections to one or more threshold values.

13. The system of claim 10, wherein the at least one processor is further configured to determine whether a computing device within the system has capacity to support a new group of connections.

14. The system of claim 13, wherein to determine whether the computing device within the system has capacity to support the new group of connections comprises to:

calculate one or more metrics indicative of performance of another system comprising the device and the system; and evaluate one or more rules using the one or more metrics.

15. The system of claim 14, wherein the one or more metrics comprise one or more of available memory, central processing unit utilization, and network responsiveness.

16. The system of claim 13, wherein the at least one processor is further configured to add the new group of connections to the computing device within the system in response to a determination that no group of connections within the system has capacity to support another bi-directional connection.

17. The system of claim 16, wherein to add the new group of connections comprises to setup a new uniform resource locator that identifies the new group of connections.

18. The system of claim 10, wherein the at least one processor is further configured to determine whether any computing device within the system has capacity to support another group of connections.

19. The system of claim 18, wherein the at least one processor is further configured to provision a computing device within the system in response to a determination that no computing device within the system has capacity to support the other group of connections.

20. The system of claim 19, wherein to provision the computing device comprises to launch a new virtual machine within the system.

* * * * *